US012180365B2

(12) United States Patent
Mahood et al.

(10) Patent No.: US 12,180,365 B2
(45) Date of Patent: Dec. 31, 2024

(54) EXTRUDED CAPACITOR FILMS WITH HIGH TEMPERATURE PERFORMANCE, METHODS OF MANUFACTURE, AND ARTICLES CONTAINING THE SAME

(71) Applicant: SHPP GLOBAL TECHNOLOGIES B.V., Bergen op Zoom (NL)

(72) Inventors: James Alan Mahood, Evansville, IN (US); Matthew Frank Niemeyer, North Chatham, NY (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 733 days.

(21) Appl. No.: 17/293,574

(22) PCT Filed: Nov. 14, 2019

(86) PCT No.: PCT/US2019/061477
§ 371 (c)(1),
(2) Date: May 13, 2021

(87) PCT Pub. No.: WO2020/102531
PCT Pub. Date: May 22, 2020

(65) Prior Publication Data
US 2022/0010129 A1   Jan. 13, 2022

(30) Foreign Application Priority Data
Nov. 14, 2018   (EP) ..................................... 18206355

(51) Int. Cl.
*C08L 69/00*   (2006.01)
*C08J 5/18*   (2006.01)
(Continued)

(52) U.S. Cl.
CPC ................. *C08L 69/00* (2013.01); *C08J 5/18* (2013.01); *H01B 3/426* (2013.01); *H01G 4/14* (2013.01);
(Continued)

(58) Field of Classification Search
CPC .......... C08L 69/00; C08L 83/04; C08K 5/103
See application file for complete search history.

(56) References Cited

U.S. PATENT DOCUMENTS

| 5,087,677 A | 2/1992 | Brekner et al. |
| 5,645,766 A | 7/1997 | Shiro et al. |

(Continued)

FOREIGN PATENT DOCUMENTS

| EP | 3910001 A1 | 11/2021 |
| JP | 2015117298 A | 6/2015 |

(Continued)

OTHER PUBLICATIONS

International Search Report for International Application No. PCT/US2019/061477, International Filing Date Nov. 14, 2019, Date of Mailing Feb. 10, 2020, 6 pages.

(Continued)

*Primary Examiner* — Robert C Boyle
(74) *Attorney, Agent, or Firm* — CANTOR COLBURN LLP

(57) ABSTRACT

A composition includes 65.0-99.85 wt % of a high heat copolycarbonate, the high heat copolycarbonate further having a number ratio of carbon atoms to a total of hydrogen, oxygen, and fluorine atoms of less than 1.12, preferably from 0.83 to less than 1.12; 0.05-0.5 wt % of a first roughening agent; and 0.1-15.0 wt % of an organic slip agent, wherein the organic slip agent comprises pentaerythritol tetrastearate, dipentaerythritol hexastearate, glycerol tristearate, high density poly(ethylene), polymethylpentene,
(Continued)

a poly(carbonate-siloxane), or a combination thereof; wherein each amount is based on the total weight of the composition and totals 100 wt %.

25 Claims, 4 Drawing Sheets

(51) Int. Cl.
*H01B 3/42* (2006.01)
*H01G 4/14* (2006.01)
*H01G 4/33* (2006.01)

(52) U.S. Cl.
CPC ........ *C08J 2369/00* (2013.01); *C08J 2383/04* (2013.01); *C08L 2201/08* (2013.01); *C08L 2203/16* (2013.01); *C08L 2205/025* (2013.01); *C08L 2205/03* (2013.01); *H01G 4/33* (2013.01)

(56) References Cited

U.S. PATENT DOCUMENTS

| | | | |
|---|---|---|---|
| 6,723,864 | B2 | 4/2004 | Silva et al. |
| 7,079,372 | B2 | 7/2006 | Weber et al. |
| 8,389,662 | B2 | 3/2013 | De Brouwer et al. |
| 10,179,854 | B1 | 1/2019 | Chen et al. |
| 2004/0039145 | A1 | 2/2004 | Silva et al. |
| 2011/0207846 | A1* | 8/2011 | Monden .................. C08L 69/00 523/134 |
| 2012/0153236 | A1 | 6/2012 | Cakmak et al. |
| 2014/0094545 | A1 | 4/2014 | Roncaglia et al. |
| 2014/0179843 | A1* | 6/2014 | van der Mee ..... C08G 73/1071 525/461 |
| 2014/0234629 | A1 | 8/2014 | Sun et al. |
| 2014/0295363 | A1 | 10/2014 | Sun et al. |
| 2016/0060403 | A1* | 3/2016 | Mahood .................. C08L 69/00 264/495 |
| 2017/0283650 | A1 | 10/2017 | Liu et al. |
| 2019/0161576 | A1 | 5/2019 | Wehrmann et al. |

FOREIGN PATENT DOCUMENTS

| | | |
|---|---|---|
| KR | 102297409 B1 | 9/2021 |
| WO | 2013175448 A1 | 11/2013 |
| WO | 2014072923 A1 | 5/2014 |
| WO | 2017196922 A1 | 11/2017 |

OTHER PUBLICATIONS

International Standard 13319; "Determination of particle size distributions—Electrical sensing zone method" Second Edition; Copyright International Organization for Standardization; 2007(E) (42 pgs).

Written Opinion for International Application No. PCT/US2019/061477, International Filing Date Nov. 14, 2019, Date of Mailing Feb. 10, 2020, 9 pages.

* cited by examiner

EXTRUDED CAPACITOR FILMS WITH HIGH TEMPERATURE PERFORMANCE, METHODS OF MANUFACTURE, AND ARTICLES CONTAINING THE SAME

CROSS-REFERENCE TO RELATED APPLICATIONS

This application is a National Stage application of PCT/US2019/061477, filed Nov. 14, 2019, which claims priority to and the benefit of EP 18206355.2, filed Nov. 18, 2018, both of which are incorporated by reference herein in their entirety.

BACKGROUND

This disclosure relates to extruded capacitor films, and in particular to capacitors including the extruded polymer films, and the manufacture of the films and the capacitors.

Electrostatic film capacitors with high volumetric energy density, high operating temperature, and long lifetime are critical components for pulse-power, automotive, and industrial electronics. Capacitors are essentially energy-storing devices having two parallel conductive plates separated by a thin layer of an electrically insulating (dielectric) film. When a voltage is applied across the plates, the electric field in the dielectric displaces electric charges, and thus stores energy. The amount of energy stored by a capacitor depends on the dielectric constant and breakdown voltage of the insulating material used to form the film, and the dimensions (total area and thickness) of the film. To maximize the total amount of energy that a capacitor can accumulate, the dielectric constant and breakdown voltage of the film are maximized, and the thickness of the film minimized. Because the physical characteristics of the dielectric material in the capacitor are the primary determining factors for the performance of a capacitor, improvements in one or more of the physical properties of the dielectric material in a capacitor can result in corresponding performance improvements in the capacitor component, usually resulting in performance and lifetime enhancements of the electronics system or product in which it is embedded.

Capacitors designed for high temperature applications can be constructed from thin films of high temperature polymers, which as used herein includes polymers having a glass transition temperature (Tg) of 170° C. or higher. Most high temperature polymers have undesirable dielectric breakdown strength at room temperature, and the dielectric breakdown strength decreases as the polymers are heated. In addition, making high quality, thin films of such polymers by extrusion has been a long-standing need in the art. Extrusion can be an efficient process, but because the films are so thin, they are very difficult to manufacture, handle, and ship.

There accordingly remains a need for high temperature capacitor films and methods for their manufacture that can produce films having excellent electrical properties, in particular high dielectric breakdown strength for use in high temperature applications. It would be a further advantage if such films could be manufactured by extrusion on a commercial scale.

SUMMARY

A composition is disclosed, comprising: 65.0-99.85 wt % of a high heat copolycarbonate comprising low heat bisphenol groups derived from a low heat monomer where the corresponding homopolycarbonate of the monomer has a Tg of lower than 155° C., determined according to ASTM E1640-13 with a 1° C./min heating rate and high heat bisphenol groups derived from a high heat bisphenol monomer having at least where the corresponding homopolycarbonate of the monomer has a Tg of 155° C. or higher, determined according to ASTM E1640-13 with a 1° C./min heating rate, the high heat copolycarbonate further having a number ratio of carbon atoms to a total of hydrogen, oxygen, and fluorine atoms of less than 1.12, preferably from 0.83 to less than 1.12; 0.05-0.5 wt % of a first roughening agent; and 0.1-15.0 wt % of an organic slip agent, wherein the organic slip agent comprises pentaerythritol tetrastearate, dipentaerythritol hexastearate, glycerol tristearate, high density poly(ethylene), polymethylpentene, a poly(carbonate-siloxane), or a combination thereof; wherein each amount is based on the total weight of the composition and totals 100 wt %.

In another aspect, an extruded film is disclosed, comprising the composition. In particular, the composition can be used to manufacture an extruded capacitor film.

A capacitor comprising an extruded film as described above is disclosed.

Also disclosed is an electronic device comprising the extruded film.

The above described and other features are exemplified by the following detailed description.

DETAILED DESCRIPTION

Figure 1:
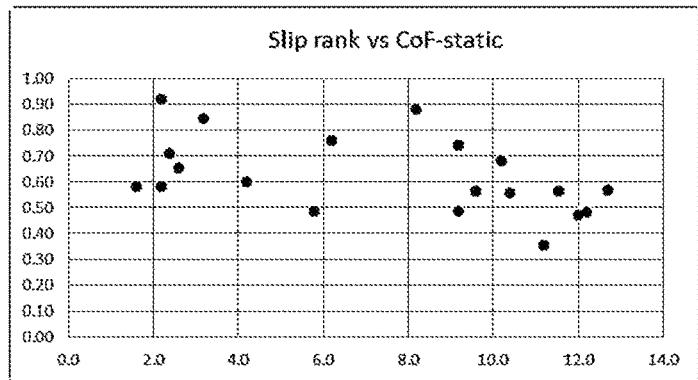
FIG. 1 is a graph showing measured static COF as determined by ASTM D1894 (y-axis) versus slip rank (x-axis).

The inventors hereof have discovered compositions that allow the manufacture of ultra-thin, high temperature capacitor films by extrusion. The film-forming compositions comprise specific amounts of a high heat polycarbonate having a specific number ratio of carbon atoms to a total of hydrogen, oxygen, and fluorine atoms, a slip agent, and a roughening agent. The identity and amounts of each of the components is balanced to achieve an advantageous combination of good flow properties, mechanical strength, electrical properties, and friction properties. Such properties have been particularly difficult to achieve in combination in a formulation that can be used to manufacture the capacitor films by extrusion. Friction properties are especially challenging because the inventors have found it important to provide acceptable slip and handling of the film through the processes of extrusion, winding onto master rolls, metallization, slitting, and finally winding into dry wound capacitors, while at the same time optimizing surface roughness of the film to maximize volumetric efficiency of a wound capacitor and breakdown strength of the films.

The high temperature films can readily withstand temperatures of 140-150° C. without softening or melting, thus reducing, or even eliminating the need for external cooling and allowing a reduction in vehicle weight. Mechanically, the films can have a low coefficient of friction (<0.6) and adequate tear resistance (>70 MPa) to allow production and handling of very thin (less than 10 µm thick) films, and stability at high operating temperatures. Electrically, the films can possess a high electrical breakdown strength (greater than 300 V/µmicron), a high dielectric constant (greater than 2.5), a low dissipation factor (less than 1%), and good self-clearing.

The films are especially useful in the automotive industry, which is in particular need of a high temperature, dry film capacitor that can operate in an underhood environment at or near 140-150° C. ambient temperature. A high temperature capacitor that can maintain capacitance, dielectric insulation resistance, and rated voltage over the lifetime of a vehicle at elevated temperatures can reduce or eliminate auxiliary cooling components, which also can reduce both the complexity of the system and system vehicle weight. High temperature capacitors can provide an increase in design flexibility in that the capacitors can be located closer to critical components and packaged more efficiently.

As stated above, compositions that can be used in the manufacture of ultra-thin, high temperature capacitor films by extrusion include a high heat copolycarbonate, at least a first roughening agent, and a slip agent.

As used herein a "copolycarbonate" includes at least two different types of carbonate groups, for example, 2, 3, or 4 different types of carbonate groups. As used herein a "high heat copolycarbonate" is a copolycarbonate comprising low heat bisphenol groups and high heat bisphenol groups. The low heat bisphenol groups are derived from a low heat bisphenol monomer having less than 19 carbon atoms. A low heat bisphenol monomer is a monomer where the corresponding homopolycarbonate of the monomer has a Tg of lower than 155° C. The high heat bisphenol groups are derived from a high heat bisphenol monomer having at least 19 carbon atoms. A high heat bisphenol monomer is a monomer where the corresponding homopolycarbonate of the monomer has a Tg of 155° C. or higher. Preferably the low heat bisphenol monomer is a monomer where the corresponding homopolycarbonate has a Tg of lower than 150° C., or lower than 145° C., and the high heat bisphenol monomer is a monomer where the corresponding homopolycarbonate has a Tg of 160° C. or higher, or 165° C. or higher. The homopolycarbonate formed by the low heat monomer can have a minimum Tg of 80° C. The homopolycarbonate formed by the high heat monomer can have a maximum Tg of 400° C.

In an aspect, the high heat copolycarbonate has a Tg of 170-250° C., or 175° C.-240° C., or 180° C.-240° C., or 190° C.-240° C. Each of the Tgs of the homopolycarbonates and the copolycarbonates can be determined by dynamic mechanical analysis (DMA) according to ASTM E1640-13 at a heating rate of 1° C./min and a frequency of 1 Hz.

With the carbon number proviso discussed in more detail below, the high heat copolycarbonates used in the films have low heat bisphenol carbonate units of formula (1)

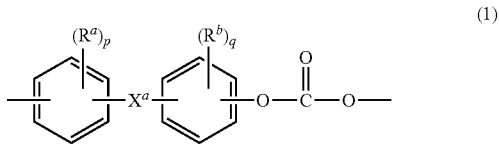

(1)

wherein $R^a$ and $R^b$ are each independently $C_{1-6}$ alkyl, $C_{2-6}$ alkenyl, $C_{3-6}$ cycloalkyl, or $C_{1-3}$ alkoxy, p and q are each independently 0-4, and $X^a$ is a single bond, —O—, —S—, —S(O)—, —S(O)$_2$—, —C(O)—, a $C_{1-6}$ alkylidene of the formula —C($R^c$)($R^d$)— wherein $R^c$ and $R^d$ are each independently hydrogen or $C_{1-3}$ alkyl, or a group of the formula —C(=$R^e$)— wherein $R^e$ is a divalent $C_{1-5}$ hydrocarbon group. Exemplary $X^a$ groups include methylene, ethylidene, neopentylidene, and isopropylidene. The bridging group $X^a$ and the carbonate oxygen atoms of each $C_6$ arylene group can be disposed ortho, meta, or para (preferably para) to each other on the $C_6$ arylene group.

In an aspect, $R^a$ and $R^b$ are each independently a $C_{1-2}$ alkyl group, p and q are each independently 0-1, and $X^a$ is a single bond, —O—, —S(O)—, —S(O)$_2$—, —C(O)—, a $C_{1-6}$ alkylidene of formula —C($R^c$)($R^d$)— wherein $R^c$ and $R^d$ are each independently hydrogen or $C_{1-3}$ alkyl, or a group of the formula —C(=$R^e$)— wherein $R^e$ is a divalent $C_{1-5}$ hydrocarbon group.

In an aspect, $R^a$ and $R^b$ are each independently a methyl group, p and q are each independently 0 or 1, and $X^a$ is a single bond or a $C_{1-6}$ alkylidene of formula —C($R^c$)($R^d$)— wherein $R^c$ and $R^d$ are each independently hydrogen or methyl.

In an aspect, p and q is each 1, and $R^a$ and $R^b$ are each a $C_{1-3}$ alkyl group, preferably methyl, disposed meta to the oxygen on each ring. The bisphenol carbonate units (1) can be derived from bisphenol A, where p and q are both 0 and $X^a$ is isopropylidene.

The low heat carbonate units (1) can be produced from the corresponding dihydroxy (bisphenol) compounds. Some illustrative examples of specific bisphenol compounds that can be used to produce first carbonate units (1) are described, for example, in WO 2013/175448 A1, US 2014/0295363, and WO 2014/072923. A combination comprising at least one of bisphenol compound can be used. In a preferred aspect, the low heat bisphenol compound is 1,1-bis(4-hydroxyphenyl) methane, 1,1-bis(4-hydroxyphenyl) ethane, 2,2-bis(4-hydroxyphenyl) propane ("bisphenol A" or "BPA"), 2,2-bis(4-hydroxyphenyl) butane, 1,1-bis(4-hydroxyphenyl) propane, 1,1-bis(4-hydroxyphenyl) n-butane, 2,2-bis(4-hydroxy-2-methylphenyl) propane, 1, 1-bis(4-hydroxy-t-butylphenyl) propane, or a combination thereof. In an aspect, the low heat monomer is bisphenol A, which provides the low heat bisphenol group of formula (1a).

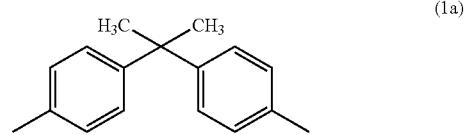

(1a)

The high heat carbonate units in the copolycarbonate are of formula (2)

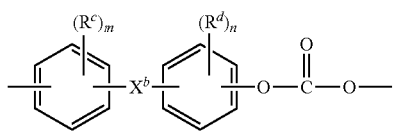
(2)

wherein $R^c$ and $R^d$ are each independently $C_{1-12}$ alkyl, $C_{2-12}$ alkenyl, $C_{3-8}$ cycloalkyl, or $C_{1-12}$ alkoxy, m and n are each independently integers of 0-4, and $X^b$ is a $C_{3-8}$ cycloalkylene, a fused $C_{6-18}$ cycloalkylene, a group of the formula -$J^1$-G-$J^2$- wherein $J^1$ and $J^2$ are the same or different $C_{1-6}$ alkylene group and G is a $C_{3-12}$ cycloalkylene, a $C_{3-12}$ cycloalkylidene, or a $C_{6-16}$ arylene, a $C_{12-25}$ alkylidene of formula —C($R^c$)($R^d$)— wherein $R^c$ and $R^d$ are each independently hydrogen, $C_{1-24}$ alkyl, $C_{4-12}$ cycloalkyl, $C_{6-12}$ aryl, $C_{7-12}$ arylalkylene, $C_{7-12}$ heteroarylalkylene, $C_{7-12}$ alkylarylene, $C_{1-12}$ heteroalkyl, $C_{3-12}$ heterocycloalkyl, or $C_{7-12}$ heteroaryl, a group of the formula —C(=$R^e$)— wherein $R^e$ is a divalent $C_{7-31}$ hydrocarbon group, a $C_{3-18}$ cycloalkylidene, a fused $C_{7-18}$ cycloalkylidene, or a fused $C_{6-18}$ heterocycloalkylidene.

Examples of such high heat bisphenol groups include groups of formulas (2a) to (2g)

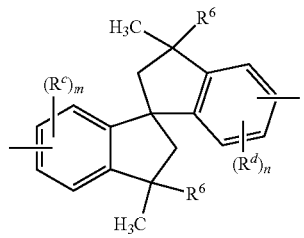
(2a)

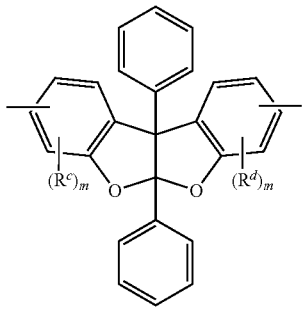
(2b)

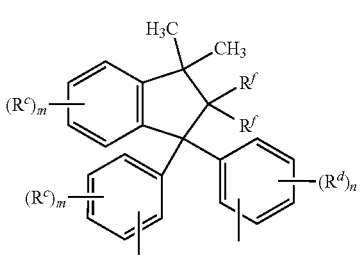
(2c)

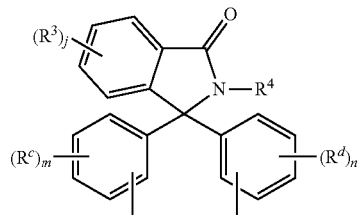
(2d)

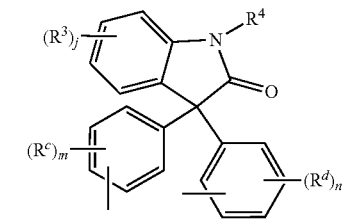
(2e)

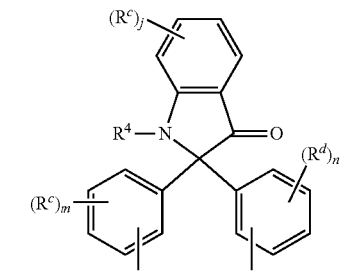
(2f)

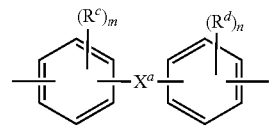
(2g)

wherein $R^c$ and $R^d$ are each independently a $C_{1-12}$ alkyl, $C_{2-12}$ alkenyl, $C_{3-8}$ cycloalkyl, or $C_{1-12}$ alkoxy, each $R^f$ is hydrogen or both $R_f$ together are a carbonyl group, each $R^3$ is independently $C_{1-6}$ alkyl, $R^4$ is hydrogen, $C_{1-6}$ alkyl, or phenyl optionally substituted with 1-5 $C_{1-6}$ alkyl groups, $R^6$ is independently $C_{1-3}$ alkyl, or phenyl, preferably methyl, $X^a$ is a $C_{6-12}$ polycyclic aryl, $C_{3-18}$ mono- or polycycloalkylene, $C_{3-18}$ mono- or polycycloalkylidene, —C($R^f$)($R^g$)— wherein $R^f$ is hydrogen, $C_{1-12}$ alkyl, or $C_{6-12}$ aryl and $R^9$ is $C_{6-10}$ alkyl, $C_{6-8}$ cycloalkyl, or $C_{6-12}$ aryl, or -($Q^a$)$_x$-G-($Q^b$)$_y$-, wherein $Q^a$ and $Q^b$ are each independently a $C_{1-3}$ alkylene, G is a $C_{3-10}$ cycloalkylene, x is 0 or 1, and y is 0 or 1, and j, m, and n are each independently 0-4. A combination of high heat bisphenol groups can be used.

In an embodiment, $R^c$ and $R^d$ are each independently a $C_{1-3}$ alkyl or $C_{1-3}$ alkoxy, each $R^6$ is methyl, each $R^3$ is independently $C_{1-3}$ alkyl, $R^4$ is methyl or phenyl, each $R^6$ is independently $C_{1-3}$ alkyl or phenyl, preferably methyl, $X^a$ is a $C_{6-12}$ polycyclic aryl, $C_{3-18}$ mono- or polycycloalkylene, $C_{3-18}$ mono- or polycycloalkylidene, —C($R^f$)($R^g$)— wherein $R^f$ is hydrogen, $C_{1-12}$ alkyl, or $C_{6-12}$ aryl and $R^9$ is $C_{6-10}$ alkyl, $C_{6-8}$ cycloalkyl, or $C_{6-12}$ aryl, or -($Q^1$)$_x$-G-($Q^2$)$_y$- group, wherein $Q^1$ and $Q^2$ are each independently a $C_{1-3}$ alkylene and G is a $C_{3-10}$ cycloalkylene, x is 0 or 1, and y is 0 or 1, and j, m, and n are each independently 0 or 1.

Exemplary high heat bisphenol groups include those of formulas (2h) to (2s)

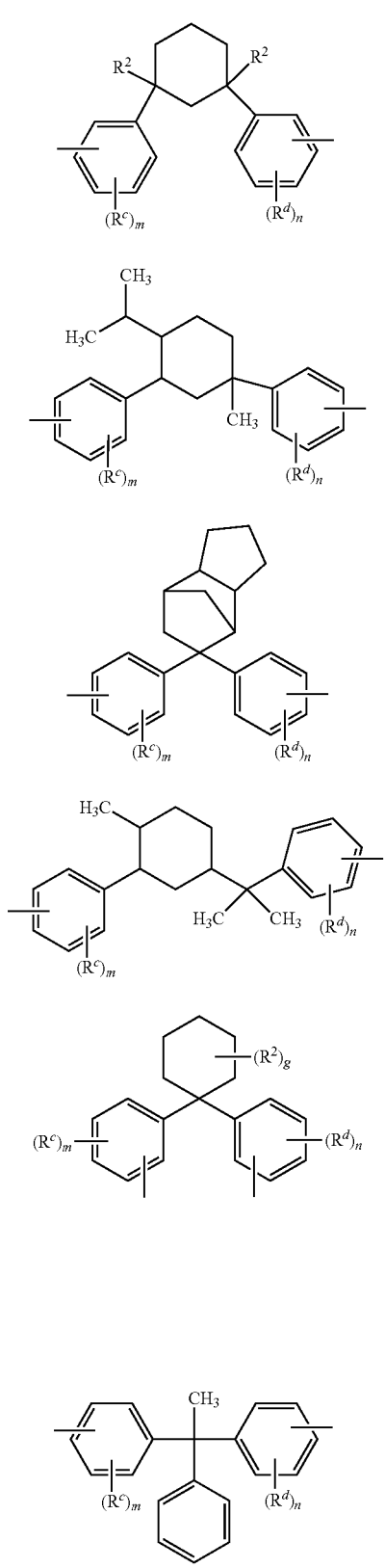
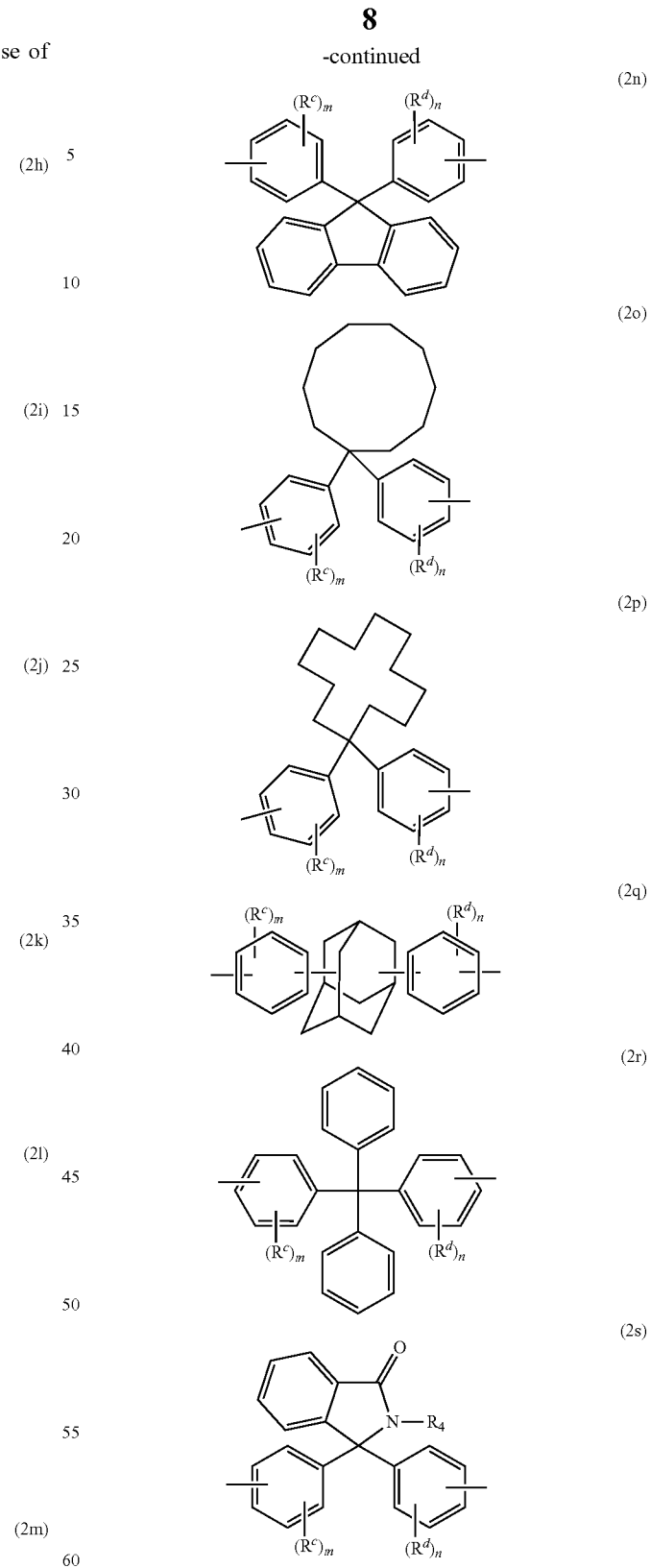

wherein $R^c$ and $R^d$ are the same as defined for formulas (2h) to (2s), each $R^2$ is independently hydrogen or $C_{1-4}$ alkyl, m and n are each independently 0-4, each $R^3$ is independently $C_{1-4}$ alkyl or hydrogen, $R^4$ is $C_{1-6}$ alkyl, or phenyl optionally substituted with 1-5 $C_{1-6}$ alkyl groups and g is 0-10. In a preferred aspect each bond of the divalent group is located para to the linking group that is $X^a$. In another preferred aspect, $R^c$ and $R^d$ are each independently a $C_{1-3}$ alkyl or $C_{1-3}$ alkoxy, each $R^2$ is methyl, x is 0 or 1, y is 1, and m and n are each independently 0 or 1.

Again, with the carbon number proviso discussed in more detail below, the high heat bisphenol group is preferably of formula (2t)

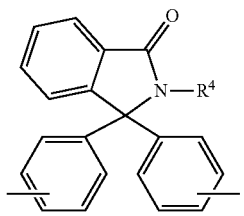

(2t)

wherein $R^4$ is methyl, or phenyl. Preferably, the high heat bisphenol group is derived from 2-phenyl-3,3'-bis(4-hydroxyphenyl) phthalimidine (PPPBP) or from 1,1-bis(4-hydroxyphenyl)-3,3,5-trimethyl-cyclohexane (BP-TMC, also known as bisphenol isophorone (BPI)).

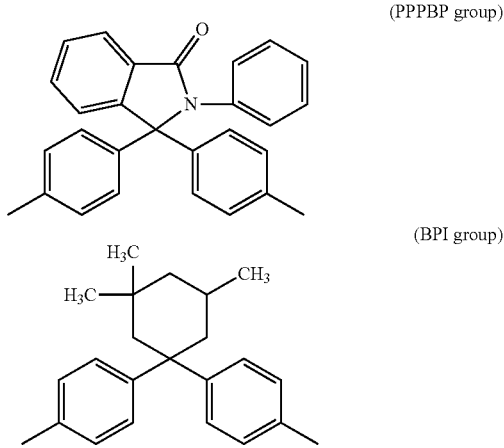

(PPPBP group)

(BPI group)

In a preferred aspect, the high heat copolycarbonate can be an N-phenylphenolphthaleinylbisphenol-bisphenol A copolycarbonate, a 3,3,5-trimethylcyclohexanone bisphenol-bisphenol A copolycarbonate, or a combination thereof.

The relative mole ratio of the low heat carbonate units (1) and high heat carbonate units (2) can vary from 99:1-1:99, depending on the desired characteristics of the copolycarbonate, including Tg, hydrolytic stability, impact strength, ductility, flow, dielectric properties, and like considerations, provided that the copolycarbonate meets the carbon number parameters discussed in more detail below. For example, the mole ratio of low heat carbonate units (1):high heat carbonate units (2) can be from 90:10-10:90, from 80:20-20:80, from 70:30-30:70, or from 60:40-40:60. In a specific aspect, the copolycarbonate comprises 60-80 mole percent (mol %) low heat carbonate units (1) and 20-40 mol % of high heat carbonate units (2), or 25-65 mol % low heat carbonate units (1) and 45-75 mol % of high heat carbonate units (2). In an aspect, the copolycarbonate is PPPBP-BPA or BPI-BPA, preferably PPP-BPA, and the mole ratio of low heat carbonate units (1) to high heat carbonate units (2) can be from 99:1-50:50, or from 80:20-45:55. In an aspect, the copolycarbonate comprises 35-55 mol % low heat carbonate units (1) and 45-65 mol % high heat carbonate units (2). In another aspect, the copolycarbonate is BPA or BPI-BPA, preferably BPI-BP, and the mole ratio of low heat carbonate units (1) to high heat carbonate units (2) can be from 20:80-60:40, or from 30:70-50:50. In an aspect, the copolycarbonate comprises 35-65 mol % low heat carbonate units (1) and 55-65 mol % high heat carbonate units (2).

Other carbonate units can be present in the copolycarbonates, for example carbonate groups including polysiloxane blocks, such as polydimethylsiloxane blocks, as described below in connection with the poly(carbonate-siloxane), and, for example, in U.S. Pat. No. 8,114,929 B2. The carbonate units comprising a polysiloxane block can be present in an amount of 1 to 25 mol %, based on based on the total moles of units in the copolycarbonate. Still other carbonate units can be present in relatively small amounts, for example less than 10 mol %, less than 5 mol %, or less than 1 mol %, based on the total moles of units in the copolycarbonate. In still another embodiment, no other types of repeating units are present in the copolycarbonates. In an embodiment, no other carbonate units are present.

Methods for the manufacture of the copolycarbonates are known, and include, for example, processes such as interfacial polymerization and melt polymerization. All types of polycarbonate end groups are contemplated as being useful, provided that such end groups do not significantly adversely affect desired properties of the film-forming compositions. Branched polycarbonate blocks can be prepared by adding a branching agent during polymerization. Methods for the manufacture of copolycarbonates, end groups, and branching agents are described, for example, in WO 2013/175448 A1, US 2014/0295363, and WO 2014/072923.

The high heat copolycarbonates can have a weight average molecular weight of 10,000-200,000 Daltons (Da), or 20,000-100,000 Da, 5,000-100,000 Da, or, more preferably 10,000-65,000 Da, or, 15,000-35,000 Da, each as measured by gel permeation chromatography (GPC), using a cross-linked styrene-divinylbenzene column and calibrated to bisphenol A homopolycarbonate references. GPC samples are prepared at a concentration of 1 mg per ml and are eluted at a flow rate of 1.5 ml per minute. Combinations of copolycarbonates of different flow properties can be used to achieve the overall desired flow property. It has been found by the inventors hereof that in order to achieve adequate self-clearing in combination with other desired mechanical and electrical properties, the high heat copolycarbonate can have a number ratio of carbon atoms to a total of hydrogen, oxygen, and fluorine atoms of less than 1.12, preferably from 0.83 to less than 1.12. Self-clearing is the ability of a capacitor to clear a fault area where a momentary short occurs due to dielectric breakdown under voltage. Without being bound by theory, it is believed that films with the good self-clearing ability have sufficient surface oxygen contents to vaporize or "burn off" the electrode around the fault area ("primary clearing"). For example, the vaporized electrode and by-products of the dielectric caused by a short can produce carbon monoxide and carbon dioxide gases. Compositions that do not have adequate self-clearing ability form carbon deposits ("char"). These carbon deposits are conductive and can lead to leakage paths through the dielectric material, triggering secondary clearings and catastrophic failure of the capacitor. Self-clearing is a performance attribute that can be difficult to quantitate, at least in part because it is determined both by the material properties and the specifics of the capacitor design and construction. However, it has been observed that good self-clearing is associated with materials with a reduced tendency to char, for example a material having a char yield of lest then 15% as determined by thermogravimetric analysis (TGA) under $N_2$. A number ratio of carbon atoms to a total of hydrogen, oxygen, and fluorine atoms of 1.54, results in inadequate self-clearing. A number ratio of carbon atoms to a total of hydrogen, oxygen, and fluorine atoms of 0.5 (as with BOPP, for example), provides adequate self-clearing, but as stated above, the Tg of these materials is too low for high-temperature applications. Advantageously, it has been found that when the number ratio of carbon atoms to a total of hydrogen, oxygen, and fluorine atoms of the high heat copolycarbonate is less than 1.11, or less than 1.07, or from 0.832-.11, or from 0.855-1.07, a film with adequate self-clearing and a Tg suitable for high heat applications is provided.

The amount of the high heat copolycarbonate in the compositions can vary from 65.0-99.85 wt %, each based on the total weight of the composition. Within these limits, the amount depends on the specific high heat copolycarbonate, roughening agent, and slip agent used, as well as the desired properties of the films as described above. For example, good handling properties can be achieved using 75.0-99.0 wt %, or 85.0 to 98.0 wt %, or 90 to 96 wt % of the. high heat copolycarbonate, each based on the total weight of the composition.

In addition to the high heat copolycarbonate described above, the films can further optionally include an additional polycarbonate that is not a high heat copolycarbonate. The additional polycarbonate can be used to adjust the flow of the film-forming composition. The additional polycarbonate can include carbonate units of formula (1). The additional polycarbonates can be homopolycarbonates or copolycarbonates. In a preferred aspect, the additional polycarbonate is a homopolymer, in particular a bisphenol A homopolymer. The additional polycarbonate can have an intrinsic viscosity, as determined in chloroform at 25° C., of 0.3-1.5 dl/gm, preferably 0.45-1.0 dl/gm. The additional polycarbonate can have an Mw of 10,000-350,000 Da, or 19,000-21,000 Da, or 300,000-320,000 Da as determined by GPC as described above. Combinations of additional polycarbonates of different flow properties can be used to achieve the overall desired flow property. When used, the additional polycarbonate can be present, for example in an amount of from 1-50 wt %, or 1-35 wt %, or 5-50 wt %, or 5-35 wt %, or 1-25 wt %, or 5-25 wt %, based on the total weight of the composition. The additional polycarbonate, preferably a bisphenol A homopolymer, can be present in an amount of 0.5-35 wt % based on the total weight of the composition.

In some aspects, no polycarbonate other than one or more high heat copolycarbonates is present. In particular, no additional low heat polycarbonate, such as a bisphenol A polycarbonate is present. It is believed that omitting any low heat polycarbonate can provide one or more improved properties, such as improved heat aging.

In an important feature, the films further include an organic slip agent and a roughening agent in combination. It has been surprisingly found that a combination of both the organic slip agent and the roughening agent provides a film having the best combination of handling properties and dielectric properties. As described above, the film-handling properties of extruded thin films for capacitors has been a long-standing problem in the art. Thin films tend to adhere to each other, making it difficult to separate the layers, and the films are difficult to store and use on an industrial scale. Sticking further causes wrinkles in the film, which is detrimental to the performance of capacitor films. Slip agents can modify the surface properties of the film and thus lower the friction between film layers and other surfaces.

Use of an organic slip agent alone can provide improved the film's handling properties but increasing amounts of the organic slip agent can degrade its electrical properties. In addition, too much slip agent can result in poorer adhesion of metals to the film. Also, when a rolled capacitor as described below is flattened, excess slip agent can lead to telescoping of the rolled capacitor. However, it has surprisingly been found that use of the organic slip agent in combination with a roughening agent can provide improved handling while at the same time maintaining good dielectric properties. As used herein, a roughening agent is an agent that provides surface roughness, i.e., a physical texture, to the surfaces of the film. Without being bound by theory, it is believed that the surface roughening provides additional anti-stick characteristics, which make the films easier to handle.

Referring now to the slip agent, it has been found that not all materials known to function as slip agents are suitable for use in the films. For example, ethylene bis(stearamide), a slip agent known for use in polycarbonate compositions is unsuitable, as is glycerol monostearate (data not shown). Other known slip agents such as di- or polyfunctional aromatic phosphates such as the bis(diphenyl) phosphate of hydroquinone and the bis(diphenyl) phosphate of bisphenol A are also unsuitable, as they tend to suppress Tg (data not shown). Still other unsuitable slip agents include poly(alpha-olefin)s and various fluorinated polymers.

Suitable slip agents can be migratory or non-migratory. Not wishing to be bound by theory, it is believed that migratory slip agents have some degree of incompatibility with the high heat copolycarbonate so that it migrates to the surface of the film. For example, during processing, slip agents can be solubilized in the melt, but as the composition cools, the slip agent can migrate to the surface, forming a lubricating layer at the surface of the film. Migratory slip agents can be used in a lesser amount than non-migratory slip agents, for example 0.01-5 wt %, based on the total weight of the composition. Non-migratory slip agents are not solubilized in the melt, can have a Tg similar to the Tg of the high heat polycarbonate, for example greater than 150° C., or greater than 170° C., or 175° C.-240° C., or 180° C.-240° C., or 190° C.-240° C., each as determined by dynamic mechanical analysis (DMA) according to ASTM E1640-13 at a heating rate of 1° C./min and a frequency of 1 Hz, or can be a polymeric slip agent that is not miscible with the high heat copolycarbonate. Non-migratory slip agents can be used in amounts of include 1-15 wt %, based on the total weight of the composition. It is to be understood, however, that the terms migratory and non-migratory are used only for convenience, and certain high molecular weight compounds can be said to be intermediate between migratory and non-migratory.

Migratory slip agents can include phthalic acid esters such as dioctyl-4,5-epoxy-hexahydrophthalate; epoxidized soybean oil; silicones, including silicone oils; polyfunctional esters, for example, polyfunctional fatty acid esters such as di-, tri-, or tetra-($C_{12-36}$ alkyl) esters, e.g., tristearin or pentaerythritol tetrastearate, and the like; ($C_{12-36}$ alkyl) esters of ($C_{12-36}$ carboxylates such as stearyl stearate; polypropylene glycol polymers, poly(ethylene glycol-co-propylene glycol) copolymers, or a combination comprising at least one of the foregoing glycol polymers; or, waxes such as beeswax, montan wax, paraffin wax, or the like. Such materials can be present in amounts of 0.01-5 wt %, based on the total weight of the composition. In a preferred aspect, the slip agent is a di-, tri-, tetra, or higher $C_{12-36}$ fatty acid ester of a polyhydric alcohol such as pentaerythritol tetrastearate, dipentaerythritol hexastearate, glycerol tristearate, or a combination thereof, present in an amount of 0.01-5 wt %, or 0.1-3 wt %, based on the total weight of the composition.

Suitable polymeric slip agents include, polymethylpentene, styrenic copolymers such as styrene-acrylonitrile copolymer (SAN) and styrene-ethylene-butylene-styrene (SEBS), a poly(carbonate-siloxane), or a combination thereof. These materials can be used in amounts of 1-15 wt %, or 3-10 wt %, each based on the total weight of the composition.

A preferred non-migratory slip agent is a poly(carbonate-siloxane). In an aspect, the composition can include 1-15 wt % of a poly(carbonate-siloxane), preferably 3-10 wt %. The poly(carbonate-siloxane) has carbonate blocks of formula (1) and siloxane blocks including repeating diorganosiloxane units of formula (3)

wherein each R is independently a $C_{1-13}$ monovalent organic group. For example, R can be a $C_{1-13}$ alkyl, $C_{1-13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkyleneoxy, $C_{7-13}$ alkylarylene, or $C_{7-13}$ alkylarylenoxy. The foregoing groups can be fully or partially halogenated with fluorine, chlorine, bromine, or iodine, or a combination thereof. In an aspect, where a transparent poly(carbonate-siloxane) is desired, R is unsubstituted by halogen. Combinations of the foregoing R groups can be used in the same copolymer.

The value of E in formula (3) can vary widely depending on the type and relative amount of each component in the thermoplastic composition, the desired properties of the composition, and like considerations. E has an average value of 2-1,000, preferably 2-500, 2-200, or 2-125, 5-80, or 10-70. In an aspect, E has an average value of 10-80 or 10-40, and in still another aspect, E has an average value of 40-80, or 40-70. Where E is of a lower value, e.g., less than 40, it can be desirable to use a relatively larger amount of the poly(carbonate-siloxane). Conversely, where E is of a higher value, e.g., greater than 40, a relatively lower amount of the poly(carbonate-siloxane) can be used. A combination of a first and a second (or more) poly(carbonate-siloxane) can be used, wherein the average value of E of the first copolymer is less than the average value of E of the second copolymer.

In an aspect, the siloxane blocks are of formula (4) or (5)

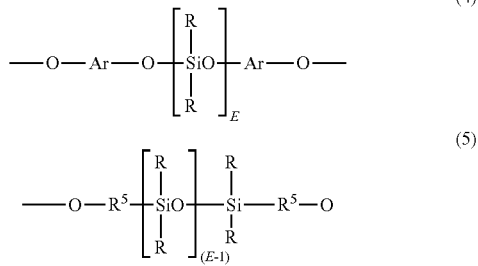

wherein E is as defined in formula (3); each R can be the same or different and is as defined in formula (3); Ar can be the same or different and is a substituted or unsubstituted $C_{6-30}$ arylene, wherein the bonds are directly connected to an aromatic moiety; and each $R^5$ is independently a divalent $C_{1-30}$ organic group. The siloxane blocks are the reaction residue of the corresponding dihydroxy compound. Ar groups in formula (4) can be derived from a $C_{6-30}$ dihydroxyarylene compound, for example 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1, 1-bis(4-hydroxyphenyl) cyclohexane, bis(4-hydroxyphenyl sulfide), and 1,1-bis(4-hydroxy-t-butylphenyl) propane, or a combination thereof can be used. In a specific aspect, the siloxane blocks are of formula (5a):

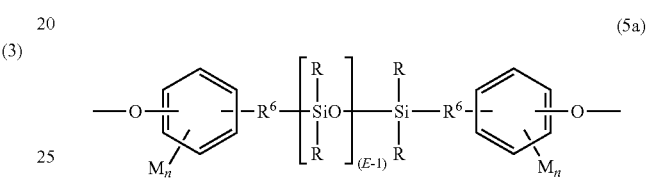

wherein R and E are as defined in formula (3); $R^6$ is a divalent $C_2$s aliphatic group; and each M can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ arylalkylene, $C_{7-12}$ arylalkyleneoxy, $C_{7-12}$ alkylarylene, or $C_{7-12}$ alkylarylenoxy, wherein each n is independently 0, 1, 2, 3, or 4. In an aspect, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In another aspect, R is methyl, or a combination of methyl and trifluoropropyl, or a combination of methyl and phenyl. In still another aspect, R is methyl, M is methoxy, n is one, and $R^6$ is a divalent $C_1$-$C_3$ aliphatic group. Specific siloxane blocks are of formulas (5b), (5c), or

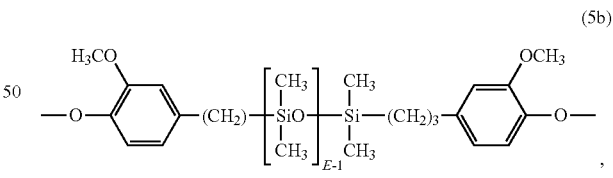

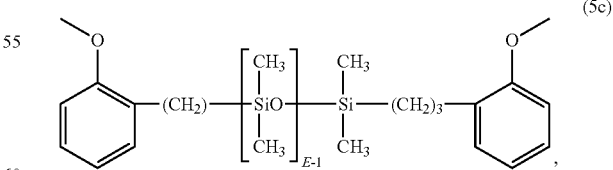

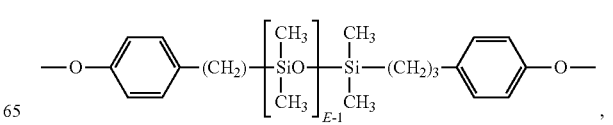

or a combination comprising thereof, wherein E has an average value of 2-200, 2-125, 5-125, 5-100, 5-50, 20-80, or 5-20.

Opaque or transparent poly(carbonate-siloxane)s can be used, where transparent copolymers can include carbonate units (1) derived from bisphenol A, and repeating siloxane units (5b), (5c), (5d), or a combination thereof (preferably of formula 5b), wherein E has an average value of 4-50, 4-15, 5-15, 6-15, or 7-10. The transparent copolymers can be manufactured using one or both of the tube reactor processes described in U.S. Patent Application No. 2004/0039145 A1 or the process described in U.S. Pat. No. 6,723,864 can be used to synthesize the poly(siloxane-carbonate) copolymers. Other methods for manufacture of the (carbonate-siloxane)s are described, for example, in EP 0 524 731 A1 page 5, Preparation 2, or in U.S. Pat. No. 8,389,662.

The poly(carbonate-siloxane) can include 50-99 wt % of carbonate units and 1-50 wt % of siloxane units. Within this range, the poly(carbonate-siloxane) can include 70-98 wt %, more preferably 75-97 wt % of carbonate units and 2-30 wt %, more preferably 3-25 wt % of siloxane units. The poly(carbonate-siloxane) can have an Mw of 2,000-100,000 Da, preferably 5,000-50,000 Da as measured by gel permeation chromatography using a crosslinked styrene-divinyl benzene column, at a sample concentration of 1 mg/ml, and as calibrated with bisphenol A polycarbonate standards. The poly(carbonate-siloxane) can have a melt volume flow rate, measured at 300° C./1.2 kg, of 1-50 cubic centimeters per 10 minutes (cc/10 min), preferably 2-30 cc/10 min. Mixtures of poly(carbonate-siloxanes) of different flow properties can be used to achieve the overall desired flow property.

Turning now to the roughening agent used in conjunction with the slip agent, a first type of roughening agent is a particulate material that provides surface roughness by physically protruding from the surface of the film. It is known to add inorganic fine particles to polymer compositions, for example, synthetic silica, limestone, natural silica, talc, zeolites, or the like. However, it has been found by the inventors hereof that use of organic roughening agents provides superior results. Without being bound by theory, it is believed that inorganic fine particles can agglomerate, and interfere with the manufacture of the capacitor films by clogging the melt filter during the extrusion process. The tendency of inorganic fine particles to agglomerate can also result in electrical weak spots in a film and lead to poor electrical performance of a film. Organic roughening agents, on the other hand, can be compatible with the high heat copolycarbonate so that the particulate organic roughening agent is more evenly distributed throughout the composition and does not clog the melt filter during extrusion. It is further believed that the particulate organic roughening agent is more pliable or elastic than the inorganic particulates, which also prevents filter clogging. Organic particulates, on the other hand, can adversely affect the dielectric properties of the capacitor film.

The inventors have found that a pliable, organic roughening agent provides an advantageous combination of good processing, handling properties, and dielectric properties. "Pliable" as used herein means that the roughening agent can deform or change shape under pressure but maintains its particulate form. Materials that form such particulates can have a Shore 00 Durometer rating of 10-90, for example, or 50-80. A first roughening agent meeting these criteria can be a crosslinked silicone, preferably a silsesquioxane, more preferably a polymethyl silsesquioxane. Silsesquioxanes are cage-like structures having Si—O—Si linkages and tetrahedral Si vertices. Silsesquioxanes can be in molecular form with 6, 8, 10, and 12 Si vertices, as well as polymer form. The cages are sometimes labeled $T_6$ $T_8$, $T_{10}$, and $T_{12}$, respectively (T=tetrahedral vertex). The $T_8$ cages have the formula $[R—SiO_{1.5}]_8$, or equivalently $R_8Si_8O_{12}$. Each Si center is bonded to three oxo groups, which in turn connect to other Si centers. The fourth group on Si is an R group. Each R group can independently be a $C_{1-8}$ alkyl, a $C_{1-8}$ alkylene, an acrylate, a methacrylate, a hydroxyl, or an epoxide.

Particulate crosslinked silicones are commercially available, for example under the trade name TOSPEARL, from Momentive Performance Chemicals. Crosslinked silicones such as TOSPEARL are spherical and have a pliable, gel-like consistency, making it amenable to processing using fine filters. For example, when the composition is passed through a melt filter (e.g., a 5 μm filter), the roughening agent does not clog the filter, avoiding the problems encountered when inorganic fine particles are used as roughening agents.

The particles of the organic roughening agent, in particular a crosslinked silicone such as a silsesquioxane can be of any shape, including regular (e.g., spherical) or irregular. The diameter of the particulate organic roughening agent can vary depending on the thickness of the films and are selected to provide the desired degree of roughening. As used herein, "diameter" refers to the diameter of a spherical particle or the diameter of a sphere having an equivalent volume of a non-spherical particle. The particulate organic roughening agent can have an average diameter of 0.1-5 μm, for example 0.2-3 μm, or 0.5-2 m; or in another aspect, 0.1-1 μm or 0.2-0.8 μm; or in still another aspect, 1-3 μm. In an aspect, the particulate organic roughening agent can have a mean diameter of 0.1-5 μm, for example 0.2-3 μm, or 0.5-2 μm; or in another aspect, 0.1-1 μm or 0.2 to 0.8 μm; or in still another aspect, 1 to 3 μm. Preferably, the particles have a maximum diameter of 5 μm or less, for ease of manufacture. The particles can further have a narrow particle size distribution, for example a difference between the minimum and maximum diameter of 0.2-2.0 μm, or 0.3-1 μm, or 0.4-0.8 μm. Average, mean, minimum, and maximum diameters can be determined by scanning electron microscopy analysis of a sample of the particles, by Coulter counter, or be liquid phase photosedimentation with gravitational and centrifugal acceleration, measurements being obtained via optical transmission wherein the proportional relationship between absorbancy and particle concentration is used in conjunction with the Stokes Sedimentation Equation.

A second type of roughening agent is a polymer having partial miscibility with the copolycarbonate and the optional additional polycarbonate and is selected to not significantly adversely affect the mechanical properties, dielectric properties, or processing of the capacitor films. Without being bound by theory, it is believed that such polymer roughening agents form immiscible islands in a continuous phase comprising the copolycarbonate and optional additional polycarbonate. Without being bound by theory, it is believed that during processing, in particular extrusion, the size of the islands is decreased, becoming very fine, and migrate to the surface of the films to provide roughening to the extruded films. The second roughening agent islands are not evenly distributed on the film surface.

The second roughening agent can be a cyclic olefin copolymer (COC). COCs can be produced by chain polymerization of a cyclic olefin monomer, such as 8,9,10-trinor-born-2-ene (norbornene) or 1,2,3,4,4a,5,8,8a-octahydro-1,4:5,8-dimethanonaphthalene (tetracyclododecene) with an acyclic olefinic monomer such as ethene, or by ring-opening metathesis polymerization of various cyclic monomers followed by hydrogenation, for example. These latter materials, which use a single type of monomer are included within the scope of COCs as that term is used herein. A cyclic olefin monomer contains an endocyclic double bond (wherein both carbon atoms of the double bond are within the ring) or an exocyclic double bond (wherein one carbon bond is within the ring and one is not). Examples of cyclic olefin monomers that can be used to manufacture COCs include norbornene and derivatives thereof, such as 2-norbornene, 5-methyl-2-norbornene, 5,5-dimethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, and 5-phenyl-2-norbornene; and cyclopentadiene and derivatives thereof such as dicyclopentadiene and 2,3-dihydrocyclopentadiene. Other cyclic olefin monomers are described in U.S. Pat. No. 5,087,677. A combination comprising one or more of the cyclic olefin monomers can be used.

The acyclic olefin monomer contains a double bond wholly outside of any ring present in the monomer. Examples of acyclic olefin monomers include alkenes having 1-20 carbon atoms, preferably 1-12 carbon atoms, most preferably 1-6 carbon atoms. Alpha-olefins are preferred, for example ethylene, 1-propene, and 1-butene. Other acyclic olefin monomers included 4-methyl-1-pentene, 1-hexene, 1-octene, 1-decene, 1-dodecene, 1-tetradecene, 1-hexadecene, 1-octadecene and 1-eicocene, 1,4-hexadiene, 4-methyl-1,4-hexadiene, 5-methyl-1,4-hexadiene, 1,7-octadiene, 5-ethylidene-2-norbornene, and 5-vinyl-2-norbornene. Preferably the acyclic olefin monomer is ethylene.

In a preferred aspect, the COC is a copolymer of a cyclic olefin monomer and ethylene. In another aspect, the COC is a copolymer of norbornene and ethylene. The COCs can have at least 15 mole percent (mol %) of units derived from the cyclic olefin monomer, or 15-90 mol %, or 15-40 mol % of units derived from the unsaturated cyclic monomers, based on total moles in the polymer. The COC can have a Tg of 60-180° C., or 60-150° C., or 70-100° C., or 100-180° C. The COC can have a heat deflection temperature of 120-175° C., measured according to ISO 75, parts 1 and 2 at 0.45 MPa. Suitable COCs are sold under the trade name TOPAS from Topas Advanced Polymers.

The relative amount of each of the copolycarbonate, and the COC in the films, and thus in the compositions used to form the films, can be varied to obtain the desired properties of the film. The COC can be present in an amount of 1-30 wt %, or 1-20 wt %, or 1-15 wt %, and preferably 2-10 wt %, wherein the total of all components equals 100 wt %.

In a preferred aspect, the film-forming composition includes a high heat polycarbonate, an organic slip agent, a first roughening agent, optionally a second roughening agent; optionally, a bisphenol A homopolymer; and optionally, an antioxidant. A high heat copolycarbonate can be present at 65.0-99.85 wt % of the total weight of the composition, having a number ratio of carbon atoms to a total of hydrogen, oxygen, and fluorine atoms from 0.83 to less than 1.12. The high heat polycarbonate is preferably an N-phenylphenolphthaleinylbisphenol-bisphenol A copolycarbonate, a 3,3,5-trimethylcyclohexanone bisphenol-bisphenol A copolycarbonate, or a combination thereof. An organic slip agent can be present at 0.1-15.0 wt % of the total weight of the composition, and is preferably a pentaerythritol tetrastearate, dipentaerythritol hexastearate, glycerol tristearate, high density poly(ethylene), polymethylpentene, or a poly(carbonate-siloxane), or a combination thereof. When the organic slip agent is a poly(carbonate-siloxane), the preferred amount of poly(carbonate-siloxane) in the film-forming composition is 5.0-15.0 wt % of the total weight of the composition. When the organic slip agent is other than a poly(carbonate-siloxane), the preferred amount of organic slip agent in the film-forming composition is 0.1-5.0 wt % of the total weight of the composition. The first roughening agent can be present in an amount of 0.05-0.5 wt % and the second roughening agent can be present in an amount of 2.0-10.0 wt %, each based on the total weight of the composition.

An antioxidant can be present in an amount of 0.02-0.06 wt % based on the total weight of the composition.

Good electrical properties are obtained when the film-forming compositions and extruded films contain low levels of certain metal ions. Thus, the film-forming compositions and films can contain less than 50 ppm, preferably less than 40 ppm, 30 ppm, 20 ppm, or 10 ppm by weight of each of aluminum, calcium, chromium, magnesium, iron, nickel, potassium, manganese, molybdenum, sodium, titanium, and zinc. In an aspect, the total amount of aluminum, calcium, chromium, magnesium, iron, nickel, potassium, manganese, molybdenum, sodium, titanium, and zinc in the film-forming compositions and films is less than 10 ppm. In addition to the copolycarbonate and the optional additional polycarbonate, the film-forming compositions and films can include various additives ordinarily incorporated into capacitor films, with the proviso that each additive is selected so as to not significantly adversely affect the desired properties of the film-forming composition and the film, in particular dielectric breakdown strength. For this reason, ionic additives are preferably not used. Possible additives include an impact modifier, flow modifier, antioxidant, heat stabilizer, light stabilizer, plasticizer, lubricant, release agent, anti-fog agent, antimicrobial agent, radiation stabilizer, non-ionic flame retardant, anti-drip agent, or a combination thereof. In general, each additive used in an amount generally known to be effective, such as 0.005-5 wt %. In an aspect, the total amount of the additives can be 0.01-5 wt %, based on the total weight of the film-forming composition or film.

Antioxidants include organophosphites such as tris(nonyl phenyl)phosphite, tris(2,4-di-t-butylphenyl)phosphite, bis (2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate; amides of beta-(3,5-di-tert-butyl-4-hydroxyphenyl)-propionic acid, or combinations comprising at least one of the foregoing antioxidants. Antioxidants can be used in amounts of 0.01-0.2 wt %, based on the total weight of the film-forming composition or film.

Heat stabilizer additives include organophosphites (e.g. triphenyl phosphite, tris-(2,6-dimethylphenyl)phosphite, tris-(mixed mono- and di-nonylphenyl)phosphite or the like), phosphonates (e.g., dimethylbenzene phosphonate or the like), phosphates (e.g., trimethyl phosphate, or the like), or combinations comprising at least one of the foregoing heat stabilizers. The heat stabilizer can be tris(2,4-di-t-butylphenyl) phosphite, commercially available as IRGAPHOS 168. Heat stabilizers can be used in amounts of 0.01-5 wt %, based on the total weight of the film-forming composition or film.

In an aspect, an extruded film includes 65.0-99.85 wt % of a high heat copolycarbonate having a number ratio of carbon atoms to a total of hydrogen, oxygen, and fluorine atoms of less than 1.12, preferably from 0.83 to less than 1.12; 5.0-15.0 wt % of poly(carbonate-siloxane) slip agent; and 0.1-5.0 wt % of an organic slip agent other than the poly(carbonate-siloxane) slip agent; optionally, 0.02-0.06 wt % of an antioxidant; wherein each amount is based on the total weight of the composition and totals 100 wt %.

In an aspect, an extruded film includes 65.0-99.85 wt % of a high heat copolycarbonate having a number ratio of carbon atoms to a total of hydrogen, oxygen, and fluorine atoms of less than 1.12, preferably from 0.83 to less than 1.12; 2.0-10.0 wt % of a cyclic olefin copolymer roughening agent; and 0.1-5.0 wt % of an organic slip agent; optionally, 0.02-0.06 wt % of an antioxidant; wherein each amount is based on the total weight of the composition and totals 100 wt %.

The capacitor films are manufactured by extrusion of a film-forming composition. The film-forming composition can be prepared by blending the ingredients under conditions for the formation of an intimate blend. Such conditions often include melt mixing in single or twin-screw type extruders, mixing bowl, or similar mixing devices that can apply a shear to the components. Twin-screw extruders are often preferred due to their more intensive mixing capability and self-wiping capability, over single screw extruders. It is often advantageous to apply a vacuum to the blend through at least one vent port in the extruder to remove volatile impurities in the composition. Often it is advantageous to dry the components prior to melting. The melt processing can be performed at 240-360° C. to minimize or avoid polymer degradation while still allowing sufficient melting to provide an intimate polymer mixture free of any unmelted components. The polymer blend can be melt filtered using candle or screen filters to remove undesirable black specks or other heterogeneous contaminants.

The film-forming composition can be extruded using extruders conventionally used for thermoplastic compositions using a flat die. An extrusion cast film method can include melting the film-forming composition as described above in an extruder, conveying the molten film-forming composition through a flat die of small lip gap separation, optionally stretching of the film using relatively high take-up speeds, and cooling/solidifying the film-forming composition to form the final film. The extruder can be of the single- or twin-screw design, and a melt pump can be used to provide a constant, non-pulsating flow of polymer through the die. The die lip gap can be as small as 100-200 µm, and the take-up rollers can operate at speeds of up to 200 meters (m)/minute (min). The design can include the addition of a heated roll to temper/anneal the film and thus minimize the occurrence of frozen-in internal stresses. The edges of the film can be trimmed, and the film wound up on a roll using a tension-controlled winding mechanism. The accuracy of delivering a constant and uniform flow of molten polymer through the die, the rheological properties of the polymer used to make the film, the cleanliness of both polymer and equipment, and the mechanical characteristics of the take-up mechanism will all contribute to the successful preparation of extruded films of relatively small thicknesses.

The extrusion cast film method can advantageously be a one-step process that is readily scalable to larger size (including large-scale manufacturing size). Melt extrusion is advantageous over solution casting for at least these reasons. Although solution casting of certain high heat copolycarbonate films has been described, the films were not reported as being manufactured on large scale. The solution casting method further requires use of solvents, which can increase the expense of the process, generate VOCs, and present waste-management concerns. It is surprising that even for polymers of high molecular weight or high Tg, the extrusion process can be designed to provide an environment for the polymer that does not lead to excessive temperatures that can cause the thermal or mechanical degradation of the material. The use of a filtration device for the melt produces a film that is virtually free of particulate contaminants that can adversely affect the quality of the film and thus the dielectric performance of the films if not properly removed from the melt. The films produced by this method are thin (10 µm in thickness, and even thinner), of uniform thickness across the web, and flat. The films can be manufactured to have no wrinkles or surface waviness.

The melted film-forming composition can be conveyed through the extruder die using a melt pump. In an aspect, the film is extruded at temperatures from 250-500° C., for example 300-450° C., and the extruded film is uniaxially stretched to produce the dielectric substrate film. In an aspect, the components of the film-forming composition are combined, melted, and intimately mixed, then filtered through a melt filter (e.g., 2-15 µm or 3-5 µm) to remove particles greater than 15 µm, greater than 10 µm, preferably greater than 5 µm, or preferably greater than 3 µm; extruded through a flat die at the foregoing temperatures. The film was drawn down in the machine direction upon leaving the die, from 250 µm (die lip opening) to a final thickness of film from 3-15 µm. The film can be directly metallized as described below or wound on a take-up roll for storage or shipping. In an aspect, the film can have a length of at least 10 meters, or 100-10,000 m, and a width of at least 300 mm, or 300-3,000 mm. The rate at which the film can be extruded can vary. In commercial aspects, the rate at which the film can be extruded varies from 10 lb./hr (4.5 kg/hr)-1000 lb./hr (450 kg/hr). The rate at which the film can be pulled from the die plate of the extruder (the take-up speed) can range from 10 m/min-300 m/min.

The polymer films can be used in any amorphous film application but are particularly suitable for metallization to form capacitors or other electronic devices. The films can be metallized on at least one side thereof. A variety of metals and metal alloys can be used depending on the intended use of the film, for example copper, aluminum, silver, gold, nickel, zinc, titanium, chromium, vanadium, platinum, tantalum, niobium, brass, or a combination comprising at least one of the foregoing. The films are metallized on at least one side, that is, a side having a surface roughness Ra, Rz, or Ry each as defined and determined by optical profilometry as described in further detail below. Methods for the metallization of polymer films are known, and include, for example, vacuum metal vapor deposition, metal sputtering, plasma treatments, electron beam treatments, chemical oxidation, or reduction reactions, as well as electroless wet-chemical deposition. The films can be metallized on both sides by conventional electroless plating. In another aspect, a patterned metal layer can be formed on a surface of the film, for example by ink jet printing.

The thickness of the metallized layer is determined by the intended use of the metallized film, and can be, for example, 0.1-1000 nm, or 0.5-500 nm, or 1-10 nm. In an aspect, the thickness of the metal film can be 1-3000 Angstroms (Å), 1-2000 Å, or 1-1000 Å. If a conductive metal is used, the resistivity of the metal layer on the film can vary from 0.1-1000 Ohm (Ω) per square or 2.0-125.0Ω per square, measured according to ASTM D257.

The films and metallized films thus produced have a variety of advantageous physical properties.

The extruded films can be very thin, having a thickness of 1-10 μm, or 1-7 μm, or 3-7 μm, or 3-5 μm.

In an aspect, the dielectric breakdown strength of the un-metallized films is greater than 700 V/μm, preferably 700-1250 V/μm, more preferably 780-1000 V/μm, even more preferably 750-900 V/μm, each at 150° C. In an aspect, the dielectric breakdown strength of the film is from 15-50% greater at 150° C. than the same film not containing a cyclic olefin copolymer.

The Tg of the unmetallized film can be 150-250° C., or 170-250° C., or 175° C.-240° C., or 180° C.-240° C., or 190° C.-240° C., preferably 180-250° C., each as determined in accordance with ASTM E1640-13 at a heating rate of 1° C./min and a frequency of 1 Hz. The extruded films are thus suitable for high-heat applications, for example, as a rolled capacitor for a transport such an automobile.

The Bosch Test clearing count (test described below) can be 0-10 at 300 V/μm.

The un-metallized films can have a high dielectric constant, in particular greater than 2.5, preferably 2.5-3.4, measured at 1 kHz, 20° C., and 50% relative humidity.

The un-metallized films can have a dissipation factor of 0.1 or less, or 0.01 or less, measured at 1 kHz, 20° C. and 50% relative humidity.

The thickness uniformity of the un-metallized films can be determined by measuring the variation in thickness of the film over a specific area. In an aspect, the un-metallized films can have variation of the thickness of the film of plus or minus (+/−) 10% or less, alternatively +/−9% or less, +/−8% or less, +/−6% or less, or +/−5%, +/−4%, +/−3%, +/−2%, +/−1% or less, based on the average thickness of the film over the measured area. In an aspect, the variation in thickness can be as low as +/−1%.

Figure 2:
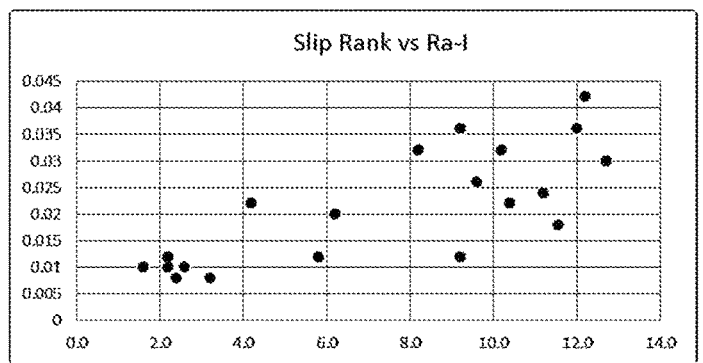
FIG. 2 is a graph showing measured Ra-I (y-axis) versus slip rank (x-axis).
Figure 3:
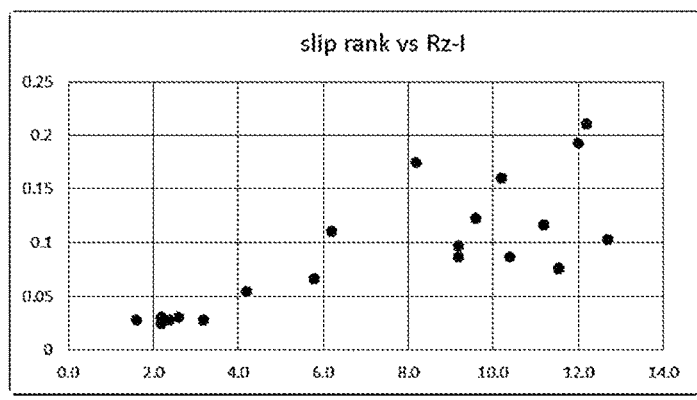
FIG. 3 is a graph showing measured Rz-I (y-axis) versus slip rank (x-axis).
Figure 4:
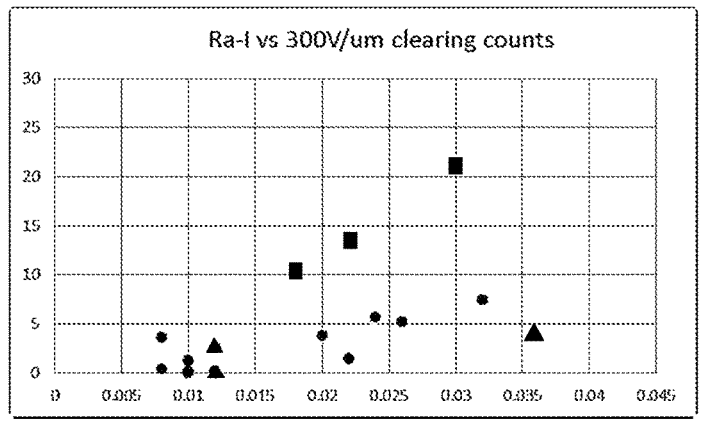
FIG. 4 is a graph showing the relationship between clearing counts at 300 V/um (y-axis) versus Ra-I (x-axis).
Figure 5:
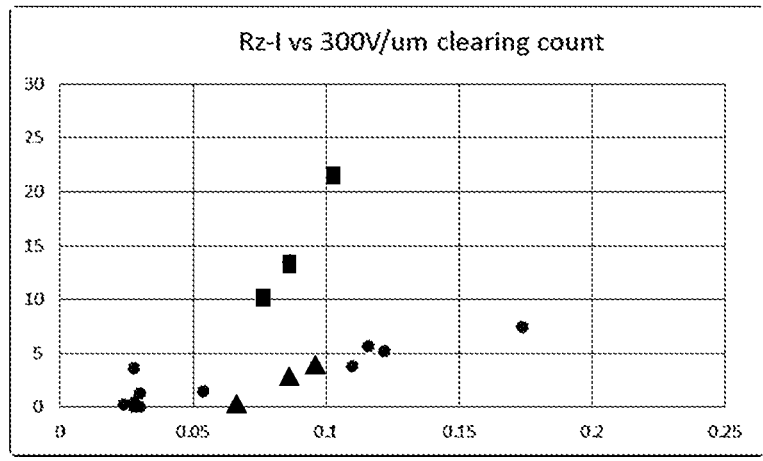
FIG. 5 is a graph showing the relationship between clearing counts at 300 V/um (y-axis) versus Rz-I (x-axis).

The roughness of a surface of the un-metallized films can be quantitated by measuring the surface roughness characteristics by optical profilometery, in particular, arithmetic mean roughness (Ra), maximum height surface roughness (Ry), and cross point average height (Rz). Surface roughness of the extruded film is optimized to provide acceptable slip and handling of the film through extrusion, winding onto master rolls, metallization, slitting and finally winding into dry wound capacitors. To achieve acceptable levels of slip for handling, winding, and flattening a capacitor, higher surface roughness is preferred. The relationship between Ra and Rz versus slip performance is shown in FIG. 2 and FIG. 3 respectively. On the other hand, optimum surface roughness of the film to maximize volumetric efficiency of a wound capacitor and breakdown strength of the film is as low as possible. High surface roughness leads to higher breakdown counts, as shown in FIG. 4 and FIG. 5. The preferred surface roughness is therefore the lowest possible Ra, Ry, or Rz (preferably all three) that are optimized to still provide acceptable slip and handling of the film through extrusion and winding onto master rolls, as well as metallization, slitting, and winding into dry wound capacitors where applicable. In an aspect, the un-metallized films can have a surface having an average Ra of less than +/−3%, less than +/−2%, or a low as +/−1% of the average thickness of the film as measured by optical profilometery. In another aspect, the un-metallized films can have a surface having an average or absolute Ra of 0.01-0.04%, an average or absolute Rz of 0.05-0.2, and an average or absolute Ry of 0.05-0.35. In another aspect the un-metallized films can have a surface having both an average Ra of less than +/−3%, less than +/−2%, or a low as +/−1% of the average thickness of the film, an average or absolute Rz of 0.05-0.2, and average or absolute Ry of 0.05-0.35.

The films and the metallized films can be essentially solvent-free, that is, contain less than 1,000 ppm, less than 750 ppm, less than 500 ppm, or less than 250 ppm of a compound having a molecular weight of less than 250 Da.

The films and the metallized films can have less than 50 ppm, less than 25 ppm, or less than 10 ppm each of aluminum, calcium, chromium, magnesium, iron, nickel, potassium, manganese, molybdenum, sodium, titanium, and zinc in the polycarbonate layer.

The metallized films can be used in any metallized film application, but are particularly suitable for electrical applications, for example as capacitors or circuit materials.

High energy density, high voltage non-polar capacitors can be made using a metalized polymer film that is wound into a cylindrical shape. In a specific aspect, the polymer film is extruded, then metallized by spraying a conductive metal such as copper or aluminum onto the moving polymer film via vapor deposition in a vacuum chamber, for example to a thickness from 1 Å-1000 nm, 1-3000 Å, or 1-1000 Å. The resistivity of the metal on the extruded film can be in a range from 0.1Ω per square-100Ω per square as determined according to ASTM D257. Before the metallization process is performed, the extruded film can be appropriately masked to provide unmetallized margins at the edges of the width of the film, so that alternate layers of metallized film (when the capacitor is assembled) have unmetallized regions at opposite edges to prevent electrical shorting of the electrodes of the capacitor when the end metallization is ultimately applied.

The capacitors can then be fabricated by rolling two stacked metalized polymer films into a tubular shape. Electrical wires are connected to each metal layer. In a specific aspect, two separate rolls of the metallized film are placed in a capacitor winder and wound tightly together on a mandrel (which can subsequently be removed) so that the layers are arranged in the sequence polymer composition/metallized layer/polymer composition/metallized layer, to replicate a typical construction of a capacitor, i.e., a dielectric with two metallic layers on opposite sides. The two rolls of film are wound with the unmetallized margins on opposite sides.

The extent of winding of the capacitor depends on the physical size of the capacitor desired or on the capacitance desired. Tight winding of the two rolls aids in removing any entrapped air that might otherwise cause premature breakdown. Individual capacitors can be processed in a clean room environment of at least class 100, incorporating HEPA filters, to reduce the likelihood of contamination of the contact point between the dielectric film layers by foreign particles, as well as reducing moisture intake in the dielectric. Electric winding can be used to better maintain uniform tension on each capacitor. The capacitor can then be taped at the edges thereof and strapped in a tray open on both sides, to prevent unwinding of the film layers and to allow the edges or ends of the cylinder to be sprayed with a conductive element, for example with a high zinc content solder followed by a regular softer end spray solder of 90% tin, 10% zinc. The first spray scratches the metallized surface and creates a trough to achieve better contact with the metallization on the dielectric film. The combination of end sprays further aids better contact adhesion with the final termination. Subsequently, conductive, e.g., aluminum leads can then be soldered onto each end to form the final termination. One termination can be spot welded to the bottom of the can, while the other termination can be parallel welded to the lid. The capacitor can be filled with a liquid impregnate (for example, isopropyl phenyl sulfone), in vacuum filling apparatus, and closed.

Other capacitor configurations are possible. For example, the capacitor can have a flat configuration comprising at least a first and a second electrode disposed in a stacked configuration; and the extruded film disposed between and in at least partial contact with each of the first and second electrodes. Additional extruded films and electrode layers can be present in alternating layers. Thus, a multilayer article for forming an electronic device is within the scope of the present claims, comprising a polymer composition/metal layer/dielectric layer, wherein the dielectric layer can be a polymer composition film as describe herein, or other dielectric material. Additional layers (e.g., additional alternating dielectric/metal layers) can optionally be present.

The extruded films, metallized films, and capacitors containing the films are useful in a wide variety of applications, for example transportation (air, land, and water) applications. Current electric and hybrid electric transport designs use large capacitors containing biaxially oriented polypropylene (BOPP) film as part of power circuits that convert direct current (DC) from batteries or fuel cells into high voltage alternating current (AC) for the drive motors. These BOPP capacitors are located under the hood of the vehicle to minimize power loss, but the temperatures inside the engine cavity are high enough to melt BOPP. The current solution is to provide special dedicated cooling loops to the electronics units to keep the BOPP capacitors from melting. These extra cooling loops add significant cost and weight to the automobile. The capacitor films are useful for the construction of inverter/converter units that allow electric and hybrid electric vehicles (including bicycles, mopeds, motorcycles, automobiles, and trucks, for example) to both recharge batteries through regenerative braking and to provide battery power to the drive units. Inverters are part of the circuits that convert low voltage (<250 V) DC power from the battery into the higher voltage (>600 V) AC power needed to efficiently operate the drive motors. These capacitors desirably operate in a high temperature environment due to both external heating from the engine compartment and internal heating due to circuit resistance. The capacitor films and capacitors containing the films can withstand the high temperatures (e.g., 140-150° C.) used in a vehicle application.

This disclosure is further illustrated by the following examples, which are non-limiting.

EXAMPLES

The materials used in the Examples are described in Table 1.

TABLE 1

| Component | Chemical Description | Source |
|---|---|---|
| PPPBP/BPA | PPPBP-BPA copolycarbonate (N-phenylphenolphthaleinylbisphenol, 2,2-bis(4-hydro)-bisphenol A copolycarbonate) produced via interfacial polymerization, 32 mol % PPPBP, para-cumylphenol (PCP) end-capped, available under the trade name XHT. | SABIC |
| BPA (low) | Bisphenol A homopolycarbonate, Mw = 19-21 kDa | SABIC |
| BPA (high) | Bisphenol A homopolycarbonate, Mw = 30-32 kDa | SABIC |
| BPI/BPA | 3,3,5-trimethylcyclohexanone bisphenol-bisphenol A copolycarbonate, 57 mol % BPI, Mw = 29,000 Da, with 0.35 wt % PETS and a triphenyl phosphite heat stabilizer, available under the trade name APEC ® 2097. | Covestro |
| PC—Si (o) | Opaque poly(carbonate-siloxane) comprising bisphenol A carbonate units and dimethyl siloxane units, 20 wt % siloxane, Mw = 29-31 = kDa | SABIC |
| PC—Si (cl) | Clear poly(carbonate-siloxane) comprising bisphenol A carbonate units and dimethyl siloxane units, 6 wt % siloxane, Mw = 22-24 = kDa | SABIC |
| COC | Cycloolefin copolymer, available under the trade name TOPAS 6017S | TOPAS |
| PMSS-1 | Particulate crosslinked polymethylsilsesquioxane, mean particle diameter = 2 µm determined via Coulter counter, bulk density = 0.35 g/cm$^3$, specific surface area = 15-35 m$^2$/g, available under the trade name TOSPEARL ® 120 | Momentive Performance Chemicals |
| PMSS-2 | Particulate crosslinked polymethylsilsesquioxane, average particle size = 0.5 µm determined via scanning electron microscopy, available under the trade name XC99-A8808 | Momentive Performance Chemicals |
| SEBS | Styrene-ethylene-butylene-styrene | Kraton |
| PETS | Pentaerythritol tetrastearate | Emery |
| AO | Tris(2,4-di-tert-butylphenyl)phosphite, available under the trade name IRGAPHOS 168, or from another supplier | Ciba |

Method of Manufacture

All compositions except where indicated were compounded on a Werner & Pfleiderer co-rotating twin screw extruder (Length/Diameter (L/D) ratio=30/1, vacuum port located near die face). The twin-screw extruder had enough distributive and dispersive mixing elements to produce good mixing between the polymer compositions. Compositions were compounded at a temperature of 285-330° C., though it will be recognized that the method is not limited to these temperatures. Films were extruded using a 25 millimeter (mm) single screw extruder utilizing a melt pump to eliminate pulsating melt flow. The melt pump was adjusted to provide optimum melt pressure in the die at temperatures of 290-350° C. The melt was extruded through a vertical 450 mm wide t-die with a die gap clearance of 100-300 µm. The melt curtain was cast onto a polished chill roll and drawn down in the machine direction to 3-15 µm thickness. Gauge was controlled by matching the melt pump output and take-up speed of the downstream equipment to provide uniform constant film thickness.

Test Methods

Coefficient of friction (CoF) of the films were measured in accordance with ASTM D1894 on two surfaces, one a metallized 200 g Bopp sled fabricated from aluminum (a 63.5 mm×63.5 mm surface), or each sample itself. The parameters were as follows: (1) table was tempered glass (150 mm×600 mm); (2) test rate of 150 mm/sec; (3) test extension 50 mm; (4) load cell 10 N; (5) 5 runs reported per sample; and (6) Instron test rack with Bluehill 3 software. Biaxially-oriented polypropylene (BOPP, 10 mm) was cut and mounted on sled metalized surface face down in contact with sample. The film test sample was mounted on tempered glass table. Against Self: (1) film sample was mounted on sled "outside" roll surface down; (2) film sample was mounted on tempered glass table "inside" roll surface up; (3) static CoF was calculated on initial peak load from transducer; (4) dynamic was calculated from average load during extension.

The Trouser Tear Test procedure ISO 6383-1 was used to measure tear resistance. Results are reported as an average of 5 runs in Newton per millimeter (N/mm). The parameters were as follows: (1) test rate: 200 mm/sec; (2) test extension: 50 mm; (3) load cell: 10 N; (4) 5 runs reported per sample; (5) Instron Test Rack w Bluehill 3 software; (6) 10 mm film sample cut into 25 mm×200 mm strips; (7) 30 mm cut made in short end of sample to initiate tear site; (8) each leg of samples mounted using pneumatic grips; (9) static was removed from sample using deionized air gun; and (10) average tear was calculated from area of load/extension curve selected by operator.

A subjective evaluation procedure for slip of film against itself was developed as alternative measurement for COF or comparative slip within a group of extruded films. Five operators handled and ranked the level of slip based on visual inspection of wrinkles on rolls of film and how well films slide against itself, then assigned the film a slip level on a scale from 1-3, with 1=low slip, 2=moderate slip, and 3=high slip, where a high level (high slip) represents better handling properties. The average rated level is reported. A slip forced ranking also utilized five operators. Averages were normalized to 1-13 within each group tested. The forced ranking was reported as average of normalized values, with 1=low slip and 13=highest slip (better handling). Although COF measurements were made and are reported below, FIG. 1 is a graph showing measured static COF as determined by ASTM D1894 (y-axis) and slip rank (x-axis). This graph shows that static COF does not correlate well with slip rank. Since slip ranking is an observable evaluation of film handling, and better reflects the practical requirements of film handling, slip ranking can be according more weight in determining the desired formulations.

Surface roughness was determined using a Keyence confocal microscope. The primary roughness image was captured on the Keyence VK-200 using a 50× objective. The sample was mounted on a flat polycarbonate plaque to minimize surface departure. The top surface of film was brought into focus using the stage height adjustment in laser measurement mode. The scan range was set manually to 1 μm above film top surface to 1 μm below film top surface. The total scan range did not exceed film thickness. The target Z scan range was 2-4 μm to ensure that the bottom side of film was not imaged during data collection. If the entire field of view could not be captured within the targeted scan range, the sample was moved in the X and Y direction to ensure a flat image was acquired. Once the scan range was set, auto gain was implemented to establish acceptable brightness and contrast settings throughout total scan range. The double scan option was used under high accuracy settings. The Z step height was 0.1 μm. The measurement was made under these settings using a 50× objective providing a 280-300 mm×200 mm field of view for data analysis. Five separate measurements were made using one 50 mm×100 mm sample at various locations. Surface roughness measurements were made in accordance to JIS B0601: 1994 standard calculations on each image. A template for multi-line scan analysis was used to calculate and report the average value determined for each of the 5 individual scans. The analysis included 60 lines across each image in the machine direction and was reported as an average for each value Ra (arithmetic mean roughness), Ry (maximum height), Rz (cross point average height), and RMS (root mean square roughness). Preprocessing of the acquired images included the following steps in accordance with Keyence recommendations: auto tilt correction; auto noise elimination; height cut level; and DCL/BCL level. Based on JIS B0601:1994, Ra, Ty, Rz, and RMS were determined. Roughness curve correction: Height data was generated by taking a roughness measurement on the tilt-corrected surface. This allowed the surface roughness to be determined from the line roughness cross section curve. Surface roughness determined a baseline by using the least squares method on the height data and determined the distance from that baseline of each height data point. The Ra calculation determined the absolute value of the height difference between the reference surface and the measured surface, then determined the average of the distance between each dot on the roughness curve surface and the reference surface. The Ry calculation was performed by determining the sum of the height of the highest peak (Yp) and the depth of the lowest valley (Yv) by comparing the distance between the reference surface and each point on the roughness curve surface. The Rz value was determined from the sum of the average of the absolute values of heights of the five highest peaks and the average of the absolute values of depths of the five lowest valleys. The RMS calculation indicated the square root of the sum of the squares of the difference between the reference surface and the roughness curve surface.

Figure 9:
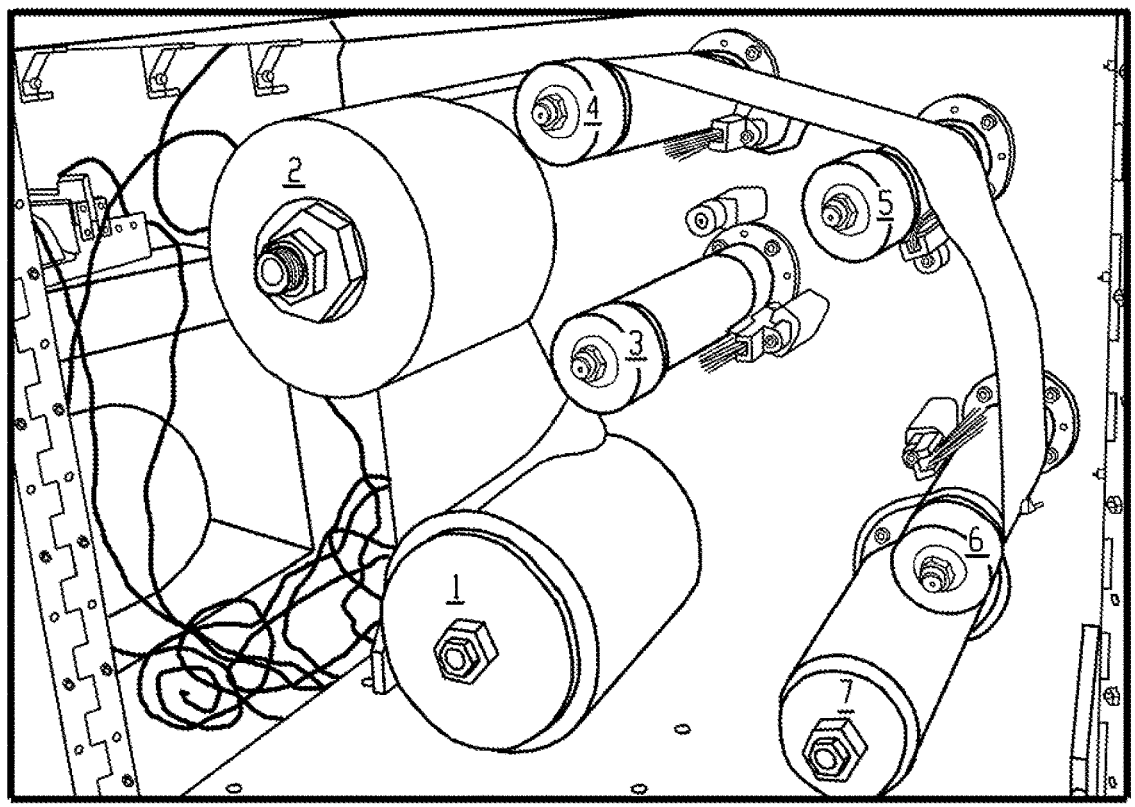
FIG. 9 shows the configuration of the electrical clearing counts testing apparatus.
Figure 10:
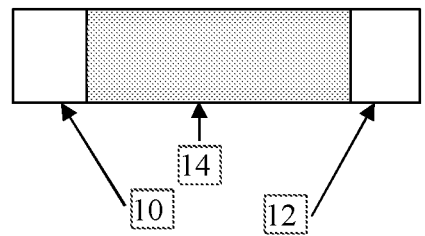
FIG. 10 shows a diagram of the testing roller configuration of the Bosch testing apparatus.

Electrical properties were determined using the Bosch test (electrical clearing counts) at a 150 V/μm, 200 V/μm, 250 V/μm, 300 V/μm, 350 V/μm, 400 V/μm, and 450 V/μm. Values listed in the tables are the clearing counts at specified voltage level (150V/μm, 200 V/μm, 250 V/μm, 300 V/μm, 350 V/μm, and 400 V/μm). Clearing counts were determined as counts/m$^2$ and are reported as an average of 5 tests per voltage level. Each test comprised of 1 square meter tested per level. The Bosch test is a continuous electrical break down test procedure and apparatus that can measure the number of breakdowns in a film that occurs at a specified voltage level. The configuration of the Bosch testing apparatus used is shown in FIG. 9. In FIG. 9, a film supply (film to be tested) is wound on roller 1; and a metalized counter electrode film is wound on roller 2. FIG. 9 further shows a grounding roller 3; a grounding roller 4; a high potential roller 5; a tensioning roller 6; and a take-up roller 7. Rollers 3, 4, and 6 were grounded. A schematic side view of a testing roller (8) is shown in FIG. 10, and includes two electrically insulating segments 10, 12, and an electrically conducting segment 14 between insulating segments 10, 12. Electrically conducting segment 14 has a length of 200 mm. A film to be tested was sandwiched between a grounded metalized layer on counter electrode film 2 and a polished steel roller. The film under test and the corresponding grounded metalized film (counter electrode) were wound through the apparatus at 10 meters per minute in a roll-to-roll process. The electrical potential of the high potential roller 5 was controlled using BK Precision1788B power supply in conjunction with a TREK 20/20C amplifier. A Labview software control interface was used in conjunction with a National instruments NI-9223 voltage input module to measure voltage/current spikes at specified voltages to determine the number of breakdown counts. The number and location of the breakdown counts was recorded for 1 square meter of film for specified voltage level 100-500 V per micron at 50 V/μmm increments. Samples were run 5 times (total 5 square meters tested) and an average clearing counts per meter square is reported for each voltage level. The parameters used for the test were as follows: width of testing film/metal segment length of 200 mm; film linear velocity of 10 m/min; Trek Power Amplifier & BK Precision 1788B supply (≤20 kV); National Instrument DAQ modules (NI-9223, NI-9263); Labview data acquisition and control; voltage levels: 100, 150, 200, 250, 300, 350, 400 V/μmm; film length was 5 m per voltage level; 1 m² test at each voltage level; each voltage level repeated 5 times total 5 m²; and average clearing counts per m² reported for each level.

Slip Ranking Vs. Surface Roughness and Clearing Counts

FIG. 2 is a graph showing measured Ra-I (y-axis) and slip rank (x-axis) for various formulations. A correlation exists, indicating that increasing Ra-I has a better slip ranking. FIG. 3 is a graph showing measured Rz-I (y-axis) and slip rank (x-axis). Increasing Rz-I has a better slip ranking.

FIG. 4 and FIG. 5 are graphs showing the relationship between clearing counts at 300 V/um (y-axis) Ra-I (x-axis, FIG. 4) and Rz-I (x-axis, FIG. 5) in PPPBP-BPA polymer formulations. FIGS. 4 and 5 both show that the three examples with the highest clearing counts (square) have an Ra-I and an Rz-I in the mid-range. These formulations contain a combination of COC and SEBS. Three formulations containing crosslinked polysilsesquioxane particles and a slip agent with low counts (less than 5) (triangle) can be found on either end of the range of Ra-I and in the lower mid-range of Rz-I.

Figure 6:
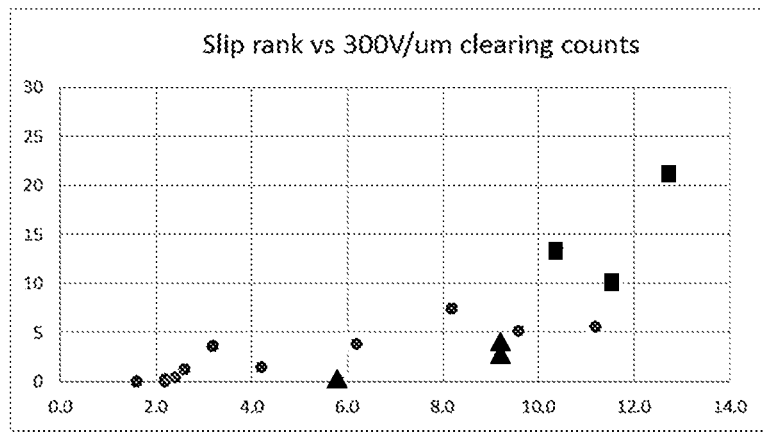
FIG. 6 is a graph showing the relationship between clearing counts at 300 V/um (y-axis) versus slip rating (x-axis).

FIG. 6 is a graph showing the relationship between clearing counts at 300 V/um (y-axis) and slip rating (x-axis). FIG. 6 indicates that higher slip rank correlates with higher clearing counts (poorer electrical performance). The three examples with the highest clearing counts (square) have a combination of COC and SEBS, and each have a slip rank of 10.0 or greater. On the other hand, three formulations with good slip ranks (5-10) and low counts (less than 5) (triangle) each have a combination of crosslinked polysilsesquioxane particles and a slip agent.

Examples 1-43

Formulations and results for Examples 1-43 are shown in Tables 2-4, for films extruded to a thickness of 7 μm, except where indicated. Amounts of each component are in parts by weight.

Data was obtained for five samples of each composition, and the average of the five values is shown for CoF, tear strength, roughness, and electrical clearing counts testing.

Comparative formulations are those with none of a slip agent (SEBS, PC-Si, or PETS), a roughening agent (COC, PMSS-1, or PMSS-2) and are marked with an asterisk (*).

The BPA/BPI high heat copolymers as obtained contained 0.35 wt % PETS and an unknown of a triphenyl phosphite antioxidant. The number of PETS shown in the tables for formulations containing BPA/BPI is a calculated total of the amount present in the BPA/BPI and any added amount. The amount of AO shown in the tables for formulations containing BPA/BPI is only any added amount.

TABLE 2

| Component | 1* | 2 | 3 | 4[1] | 5 | 6 | 7 | 8[1] | 9* |
|---|---|---|---|---|---|---|---|---|---|
| BPI/BPA | | | | | | 64.77 | 64.77 | 99.62 | |
| PPPBP/BPA | 70 | 70 | 70 | 70 | 70 | | | | 70 |
| PC (low) | 29.64 | 29.49 | 29.34 | | 29.49 | 34.73 | 34.58 | | 29.94 |
| PC (high) | | | | 29.49 | | | | | |
| PC—Si (o) | | | | | | | | | |
| PC—Si (cl) | | | | | | | | | |
| SEBS | | | | | | | | | |
| PETS | 0.3 | 0.3 | 0.3 | 0.3 | 0.3 | 0.33 | 0.33 | 0.23 | |
| COC | | | | | | | | | |
| PMSS-1 | | | | | 0.15 | | | | |
| PMSS-2 | | 0.15 | 0.3 | 0.15 | | 0.15 | 0.3 | 0.15 | |
| AO | 0.06 | 0.06 | 0.06 | 0.06 | 0.06 | 0.02 | 0.02 | | 0.06 |
| Mechanical tear strength (N/nm) | | | | | | | | | |
| TD Tear | 0.65 | 0.92 | 0.84 | 0.72 | 0.77 | 1.02 | 1.05 | 0.98 | 0.86 |
| MD Tear | 0.57 | 0.91 | 0.69 | 0.55 | 0.72 | 0.97 | 0.65 | 0.97 | 0.83 |
| CoF on metalized BOPP film | | | | | | | | | |
| Dynamic | 0.46 | 0.44 | 0.60 | 0.53 | 0.41 | 0.69 | 0.63 | 0.65 | 0.83 |
| Static | 0.58 | 0.48 | 0.74 | 0.63 | 0.56 | 0.80 | 0.65 | 0.72 | 0.92 |
| CoF on bare film | | | | | | | | | |
| S-Dynamic | 2.00 | 1.03 | 1.14 | 1.27 | 0.62 | 2.00 | 2.00 | 2.00 | 2.00 |
| S-Static | 2.00 | 1.25 | 1.31 | 1.55 | 0.80 | 2.00 | 2.00 | 2.00 | 2.00 |
| Slip ratings | | | | | | | | | |
| Slip Rank | 1.6 | 5.8 | 9.2 | 3.6 | 9.6 | 3.6 | 7.6 | 5.4 | 2.2 |
| Slip Level | 1.0 | 1.6 | 2.2 | 1.4 | 2.4 | 1.4 | 2.0 | 1.4 | 1.0 |
| Surface roughness | | | | | | | | | |
| Ra-I (μm) | 0.01 | 0.012 | 0.012 | 0.014 | 0.026 | 0.01 | 0.014 | 0.01 | 0.01 |
| Ry-I (μm) | 0.058 | 0.098 | 0.116 | 0.104 | 0.282 | 0.084 | 0.12 | 0.088 | 0.042 |
| Rz-I (μm) | 0.028 | 0.066 | 0.086 | 0.07 | 0.122 | 0.064 | 0.088 | 0.064 | 0.024 |

TABLE 2-continued

| | | | | Bosch test | | | | | |
|---|---|---|---|---|---|---|---|---|---|
| 150 V/μm | 0 | 0 | 0 | 23.2 | 0 | 0 | 0 | 270.2 | 0 |
| 200 V/μm | 0 | 0 | 0 | 123.6 | 0.6 | 1 | 1.8 | 1406 | 0 |
| 250 V/μm | 0 | 0 | 0 | 421.4 | 0.2 | 0.2 | 9 | 2024 | 0 |
| 300 V/μm | 0 | 0.2 | 2.6 | 1262 | 5.2 | 0.6 | 36 | 2138 | 0.2 |
| 350 V/μm | 0.2 | 0.8 | 7.2 | 2003 | 28.8 | 1.4 | 174.4 | 2270 | 0.8 |
| 400 V/μm | 0.8 | 3.4 | 38.6 | 428.2 | 127.8 | 20 | 595 | | 10.6 |

| | | Example No. | | | | | | |
|---|---|---|---|---|---|---|---|---|
| Component | | 10 | 11 | 12 | 13 | 14 | 15 | 16 |
| BPI/BPA | | | | | | | | 64.77 |
| PPPBP/BPA | | 70 | 70 | 70 | 70 | 64.04 | 61.94 | |
| PC (low) | | 29.79 | 29.64 | 29.64 | 29.34 | 27.45 | 26.55 | 34.88 |
| PC (high) | | | | | | | | |
| PC—Si (o) | | | | | | | | |
| PC—Si (cl) | | | | | | | | |
| SEBS | | | | | | | 3 | |
| PETS | | | | 0.3 | 0.3 | 0.3 | 0.3 | 0.33 |
| COC | | | | | | 8 | 8 | |
| PMSS-1 | | 0.15 | 0.3 | | 0.3 | 0.15 | 0.15 | |
| PMSS-2 | | | | | | | | |
| AO | | 0.06 | 0.06 | 0.06 | 0.06 | 0.06 | 0.06 | 0.02 |
| | | Mechanical tear strength (N/nm) | | | | | | |
| TD Tear | | 0.90 | 0.84 | 0.83 | 0.99 | 0.83 | 0.94 | 0.92 |
| MD Tear | | 1.07 | 0.76 | 0.84 | 0.83 | 0.85 | 0.59 | 1.05 |
| | | COF on metalized BOPP film | | | | | | |
| Dynamic | | 0.65 | 0.79 | 0.46 | 0.41 | 0.61 | 0.43 | 0.80 |
| Static | | 0.76 | 0.88 | 0.71 | 0.47 | 0.68 | 0.48 | 0.84 |
| | | CoF on bare film | | | | | | |
| S-Dynamic | | 2.00 | 1.16 | 2.00 | 0.52 | 0.67 | 0.56 | 2.00 |
| S-Static | | 2.00 | 1.48 | 2.00 | 0.62 | 0.79 | 0.60 | 2.00 |
| Slip ratings | | | | | | | | |
| Slip Rank | | 6.2 | 8.2 | 2.4 | 12.0 | 10.2 | 12.2 | 3.2 |
| Slip Level | | 2.0 | 2.2 | 1.0 | 3.0 | 2.6 | 3.0 | 1.0 |
| | | Surface roughness | | | | | | |
| Ra-I (μm) | | 0.02 | 0.032 | 0.008 | 0.036 | 0.032 | 0.042 | 0.008 |
| Ry-I (μm) | | 0.242 | 0.336 | 0.04 | 0.382 | 0.322 | 0.376 | 0.056 |
| Rz-I (μm) | | 0.11 | 0.174 | 0.028 | 0.192 | 0.16 | 0.21 | 0.028 |
| | | Bosch test | | | | | | |
| 150 V/μm | | 0 | 0 | 0 | 0 | 0 | 0 | 0 |
| 200 V/μm | | 0 | 1.2 | 0 | 3 | 1.6 | 5.6 | 0.2 |
| 250 V/μm | | 1.2 | 1.8 | 0.2 | 10 | 18.6 | 19.2 | 0.6 |
| 300 V/μm | | 3.8 | 7.4 | 0.4 | 70 | 86.2 | 95 | 3.6 |
| 350 V/μm | | 27 | 41.6 | 4.2 | 271 | 314.6 | 344 | 21.6 |
| 400 V/μm | | 132.6 | 205.8 | 29.2 | 1009 | 927 | 1015 | 120.6 |

[1]Films had a thickness of 7 μm and die lines were observed

TABLE 3

| | Example No. | | | | | | | |
|---|---|---|---|---|---|---|---|---|
| Component | 17 | 18 | 19* | 20*[2] | 21*[2] | 22*[2] | 23[2] | 24[2] |
| BPI/BPA | 64.77 | 64.77 | | 64.64 | 64.64 | 64.64 | | |
| PPPBP/BPA | | | 70 | | | | 63.8 | 63.59 |
| PC (low) | 34.73 | 24.73 | 29.64 | | | | 27.34 | 27.25 |
| PC (high) | | | | 15 | 12.5 | 10 | | |
| PC—Si (o) | | 10 | | 10 | 12.5 | 15 | | |
| PC—Si (cl) | | | | 10 | 10 | 10 | | |
| SEBS | | | | | | | 0.5 | 0.8 |
| PETS | 0.33 | 0.33 | 0.3 | 0.33 | 0.53 | 0.53 | 0.3 | 0.3 |
| COC | | | | | | | 8 | 8 |
| PMSS-1 | 0.15 | | | | | | | |
| PMSS-2 | | 0.15 | | | | | | |
| AO | 0.02 | 0.02 | 0.06 | 0.06 | 0.06 | 0.06 | 0.06 | 0.06 |

TABLE 3-continued

| | | | | | | | | |
|---|---|---|---|---|---|---|---|---|
| Mechanical tear strength | | | | | | | | |
| TD Tear | 1.14 | 0.96 | 0.65 | 1.06 | 0.99 | 0.85 | 0.98 | 0.98 |
| MD Tear | 0.94 | 1.04 | 0.57 | 0.98 | 0.92 | 0.77 | 0.70 | 0.92 |
| CoF on metalized BOPP film | | | | | | | | |
| Dynamic | 0.58 | 0.37 | 0.46 | 0.51 | 0.31 | 0.29 | 0.52 | 0.47 |
| Static | 0.62 | 0.41 | 0.58 | 0.60 | 0.36 | 0.35 | 0.56 | 0.56 |
| CoF on bare film | | | | | | | | |
| S-Dynamic | 0.96 | 0.40 | 2.00 | 2.00 | 2.00 | 2.00 | 1.11 | 1.46 |
| S-Static | 1.11 | 0.43 | 2.00 | 2.00 | 2.00 | 2.00 | 1.16 | 1.80 |
| Slip rating | | | | | | | | |
| Slip Rank | 8.4 | 10.2 | 2.2 | 4.6 | 6.9 | 6.1 | 12.7 | 11.6 |
| Slip Level | 2.6 | 2.8 | 1.0 | 1.2 | 1.8 | 1.6 | 3.0 | 2.8 |
| Surface roughness | | | | | | | | |
| Ra-I (μm) | 0.026 | 0.018 | 0.012 | 0.01 | 0.01 | 0.01 | 0.03 | 0.018 |
| Ry-I (μm) | 0.286 | 0.136 | 0.062 | 0.07 | 0.09 | 0.09 | 0.184 | 0.11 |
| Rz-I (μm) | 0.12 | 0.094 | 0.03 | 0.05 | 0.064 | 0.064 | 0.102 | 0.076 |
| Bosch test | | | | | | | | |
| 150 V/μm | | | | 0 | 0 | 0 | 0 | 0 |
| 200 V/μm | 0.6 | 0 | 0 | 0.428 | 16.25 | 2 | 0 | 0.2 |
| 250 V/μm | 1 | 5 | 0 | 0.286 | 9 | 2 | 4.8 | 1.4 |
| 300 V/μm | 1.4 | 3.6 | 0 | 3.429 | 12.75 | 13 | 21.4 | 10.4 |
| 350 V/μm | 6.2 | 49.6 | 0 | 9.714 | 105.5 | 17 | 75.2 | 44 |
| 400 V/μm | 28.6 | 130 | 0.4 | 66.71 | 305.5 | 276 | 263.8 | 165.2 |

| | Example No. | | | | | | |
|---|---|---|---|---|---|---|---|
| Component | 25[2] | 26*[2] | 27 | 28[3] | 29[3] | 30 | 31 |
| BPI/BPA | | | | | | | |
| PPPBP/BPA | 63.38 | 69.64 | 69.59 | 69.14 | 69.59 | 69.14 | 69.59 |
| PC (low) | 27.16 | 30 | 30 | 30 | 30 | 30 | 20 |
| PC (high) | | | | | | | |
| PC—Si (o) | | | | | | | 10 |
| PC—Si (cl) | | | | | | | |
| SEBS | 1.1 | | | | | | |
| PETS | 0.3 | 0.3 | 0.3 | 0.3 | 0.3 | 0.3 | 0.3 |
| COC | 8 | | | | | | |
| PMSS-1 | | | 0.05 | 0.5 | | | 0.05 |
| PMSS-2 | | | | | 0.05 | 0.5 | |
| AO | 0.06 | 0.06 | 0.06 | 0.06 | 0.06 | 0.06 | 0.06 |
| Mechanical tear strength | | | | | | | |
| TD Tear | 1.05 | 0.67 | 0.74 | 0.92 | 0.73 | 0.75 | 0.65 |
| MD Tear | 0.96 | 0.83 | 0.86 | 0.71 | 0.56 | 0.67 | 0.53 |
| CoF on metalized BOPP film | | | | | | | |
| Dynamic | 0.49 | 0.50 | 0.48 | 0.32 | 0.41 | 0.39 | 0.31 |
| Static | 0.56 | 0.65 | 0.60 | 0.36 | 0.45 | 0.48 | 0.35 |
| CoF on bare film | | | | | | | |
| S-Dynamic | 1.48 | 2.00 | 0.55 | 0.53 | 2.00 | 0.77 | 0.36 |
| S-Static | 1.70 | 2.00 | 0.58 | 0.61 | 2.00 | 0.80 | 0.39 |
| Slip rating | | | | | | | |
| Slip Rank | 10.4 | 2.6 | 4.2 | 12.0 | 2.6 | 9.2 | 11.2 |
| Slip Level | 2.8 | 1.0 | 1.6 | 3.0 | 1.0 | 2.4 | 2.8 |
| Surface roughness | | | | | | | |
| Ra-I (μm) | 0.022 | 0.01 | 0.022 | 0.066 | 0.018 | 0.036 | 0.024 |
| Ry-I (μm) | 0.136 | 0.052 | 0.188 | 0.636 | 0.102 | 0.216 | 0.274 |
| Rz-I (μm) | 0.086 | 0.03 | 0.054 | 0.354 | 0.032 | 0.096 | 0.116 |
| Bosch test | | | | | | | |
| 150 V/μm | 0 | 0 | 0 | 0 | 0 | 0 | 0 |
| 200 V/μm | 1 | 0 | 0 | 0 | 0 | 0 | 0.4 |
| 250 V/μm | 3.6 | 0.4 | 0 | 258 | 149.6 | 0.8 | 2 |
| 300 V/μm | 13.6 | 1.2 | 1.4 | 828.4 | 549.2 | 3.8 | 5.6 |
| 350 V/μm | 53 | 2 | 4 | 1306 | 943.4 | 18.6 | 22.5 |
| 400 V/μm | 198.2 | 6.8 | 16.4 | 0 | 1178 | 120.2 | 48 |

[2] Films had a thickness of 5 μm
[3] Films had a thickness of 10 μm and die lines were observed

TABLE 4

| Component | Example No. | | | | | | | | |
|---|---|---|---|---|---|---|---|---|---|
| | 32* | 33* | 34 | 35 | 36* | 37* | 38 | 39 | 40 |
| BPI/BPA | | 99.65 | 99.5 | 99.35 | | | | | |
| PPPBP/BPA | 70 | | | | 99.64 | 94.64 | 94.64 | 99.49 | 89.64 |
| PC (low) | 29.64 | | | | | | | | |
| PC (high) | | | | | | | | | |
| PC—Si (o) | | | | | | 5.00 | | | 5.00 |
| PC—Si (cl) | | | | | | | | | |
| SEBS | | | | | | | | | |
| PETS | 0.3 | 0.35 | 0.35 | 0.35 | 0.30 | 0.30 | 0.30 | 0.30 | 0.30 |
| COC | | | | | | | 5.00 | | 5.00 |
| PMSS-1 | | | 0.15 | | | | | | |
| PMSS-2 | | | | 0.3 | | | | 0.15 | |
| AO | 0.06 | 0 | 0 | 0 | 0.06 | 0.06 | 0.06 | 0.06 | 0.06 |
| Mechanical Tear Strength | | | | | | | | | |
| TD Tear | 0.65 | 1.04 | 0.64 | 0.76 | 0.67 | 0.74 | 0.93 | 0.76 | 0.59 |
| MD Tear | 0.57 | 0.85 | 0.94 | 0.56 | 0.61 | 0.79 | 0.55 | 0.81 | 0.42 |
| CoF on metalized BOPP film | | | | | | | | | |
| Dynamic | 0.46 | 0.84 | 0.71 | 0.80 | 0.44 | 0.42 | 0.51 | 0.41 | 0.39 |
| Static | 0.58 | 0.96 | 0.92 | 0.95 | 0.57 | 0.52 | 0.62 | 0.45 | 0.44 |
| CoF Coefficient of Friction on bare film | | | | | | | | | |
| S-Dynamic | 2.00 | 2.00 | 2.00 | 0.78 | 2.00 | 2.00 | 2.00 | 2.00 | 2.00 |
| S-Static | 2.00 | 2.00 | 2.00 | 0.86 | 2.00 | 2.00 | 2.00 | 2.00 | 2.00 |
| Slip ratings | | | | | | | | | |
| Slip Rank | 1.9 | 1.6 | 11.7 | 10.7 | 1.4 | 3.8 | 5.2 | 6.2 | 6.2 |
| Slip Level | 1.2 | 1 | 2.6 | 2.6 | 1 | 1 | 1.2 | 1.8 | 1.2 |
| Surface roughness | | | | | | | | | |
| Ra-I (μm) | 0.012 | 0.010 | 0.017 | 0.030 | 0.008 | 0.011 | 0.012 | 0.01 | 0.016 |
| Ry-I (μm) | 0.062 | 0.050 | 0.138 | 0.294 | 0.046 | 0.087 | 0.089 | 0.089 | 0.123 |
| Rz-I (μm) | 0.030 | 0.027 | 0.100 | 0.121 | 0.021 | 0.06 | 0.062 | 0.063 | 0.092 |
| Bosch test | | | | | | | | | |
| 150 V/μm | 0.0 | 0 | 0 | 0 | 0 | 0 | 0 | 0 | 0 |
| 200 V/μm | 0.0 | 0.0 | 0.2 | 0.2 | 0 | 0.4 | 0.8 | 0.4 | 0.2 |
| 250 V/μm | 0.0 | 0.0 | 0.2 | 0.5 | 0.4 | 4 | 7.2 | 5.6 | 4 |
| 300 V/μm | 2.0 | 0.4 | 2.8 | 5.8 | 3.2 | 20.4 | 44.8 | 46.2 | 10.4 |
| 350 V/μm | 17.8 | 0.4 | 19.0 | 33.5 | 15.4 | 111.6 | 216.2 | 295.6 | 51.6 |
| 400 V/μm | 96.8 | 2.4 | 94.4 | 181.2 | 83 | 475.4 | 785.4 | 1076 | 208.2 |

| Component | Example No. | | | | | | |
|---|---|---|---|---|---|---|---|
| | 41 | 42 | 43 | 44* | 45 | 46 | 47 |
| BPI/BPA | | | | | | 94.49 | |
| PPPBP/BPA | 94.49 | 94.49 | 89.49 | 94.64 | 94.49 | | 63.59 |
| PC (low) | | | | | | | 27.25 |
| PC (high) | | | | | | | |
| PC—Si (o) | 5.00 | | 5.00 | 5.0 | 5.0 | 5.0 | |
| PC—Si (cl) | | | | | | | 0.8 |
| SEBS | | | | | | | |
| PETS | 0.30 | 0.30 | 0.30 | 0.3 | 0.3 | 0.3 | 0.3 |
| COC | | 5.00 | 5.00 | | | | 8 |
| PMSS-1 | | | | | | | |
| PMSS-2 | 0.15 | 0.15 | 0.15 | | 0.15 | 0.15 | |
| AO | 0.06 | 0.06 | 0.06 | 0.06 | 0.06 | 0.06 | 0.06 |
| Mechanical Tear Strength | | | | | | | |
| TD Tear | 0.68 | 0.87 | 0.63 | 0.37 | 0.67 | 0.36 | 0.50 |
| MD Tear | 0.61 | 0.58 | 0.48 | 0.56 | 0.70 | 0.31 | 0.59 |
| CoF on metalized BOPP film | | | | | | | |
| Dynamic | 0.35 | 0.45 | 0.50 | 0.48 | 0.48 | 0.62 | 0.60 |
| Static | 0.37 | 0.48 | 0.55 | 0.53 | 0.53 | 0.70 | 0.63 |
| CoF Coefficient of Friction on bare film | | | | | | | |
| S-Dynamic | 0.96 | 0.99 | 1.26 | 2.00 | 0.57 | 2.00 | 1.52 |
| S-Static | 1.12 | 1.14 | 1.54 | 2.00 | 0.65 | 2.00 | 1.71 |
| Slip ratings | | | | | | | |
| Slip Rank | 11.6 | 11.4 | 10.4 | 2.9 | 11.4 | 7.5 | 8.5 |
| Slip Level | 2.6 | 2.8 | 2.6 | 1.0 | 2.8 | 2.0 | 2.0 |

TABLE 4-continued

| | | | | | | | |
|---|---|---|---|---|---|---|---|
| Surface roughness | | | | | | | |
| Ra-I (μm) | 0.011 | 0.011 | 0.02 | 0.012 | 0.014 | 0.01 | 0.028 |
| Ry-I (μm) | 0.117 | 0.107 | 0.139 | 0.102 | 0.128 | 0.11 | 0.202 |
| Rz-I (μm) | 0.085 | 0.083 | 0.105 | 0.074 | 0.096 | 0.084 | 0.124 |
| Bosch test | | | | | | | |
| 150 V/μm | 0 | 0 | 0 | 0 | 0 | 0 | 0 |
| 200 V/μm | 0 | 0.2 | 0.8 | 0.6 | 0.2 | 0 | 0.4 |
| 250 V/μm | 3 | 4 | 9.4 | 8.6 | 3.6 | 2.25 | 2.4 |
| 300 V/μm | 16.4 | 27 | 46 | 39 | 13.6 | 3 | 8.6 |
| 350 V/μm | 76.2 | 135.2 | 209.6 | 210.2 | 66.8 | 8.4 | 39.2 |
| 400 V/μm | 348.8 | 550.6 | 787.2 | 916.4 | 265.6 | 25.8 | 108.6 |

As discussed above, the films having observable die lines, or a high number of defects yielded less reliable electrical data. Examples 4, 8, 28, and 29 had elevated clearing counts in the Bosch testing and the assignable cause was die lines. The die lines were believed to have no impact on the other measurements.

Examples 20-26 were 5 μm thick, which can shift the electrical clearing counts slightly higher even though the voltage level was normalized for thickness. The thickness difference can contribute to higher clearing counts but would not be expected to impact the other measurements.

Examples 1-7 show that for 7 μm films containing a high heat copolycarbonate, a BPA homopolycarbonate, and a slip agent, addition of a particulate crosslinked polymethylsilsesquioxane improves the slip rating of the film, but slightly increases the electrical clearing counts. Increasing the amount of the particulate crosslinked polymethylsilsesquioxane improves the slip rating of the film still further, but greatly increases the electrical clearing counts (Ex2 vs. Ex3 and Ex6 vs. Ex7).

In Examples 27-31, the amount of the particulate crosslinked polymethylsilsesquioxane was decreased to 0.05 weight percent (wt %), with the expectation that the decrease would result in much lower electrical clearing counts; however, the decrease was modest. Further, increasing the amount of the particulate crosslinked polymethylsilsesquioxane to 0.5 wt % surprisingly did not result in a dramatic increase in the electrical clearing counts.

Examples 33-35, which have only a roughening agent and no slip agent show slip ratings in the 10-12 range and a modest increase in electrical clearing counts.

Examples 36-43 show that for some formulations where no bisphenol A homopolycarbonate are used, the slip ratings are 10-12 with an increase in the electrical clearing counts.

Figure 7:
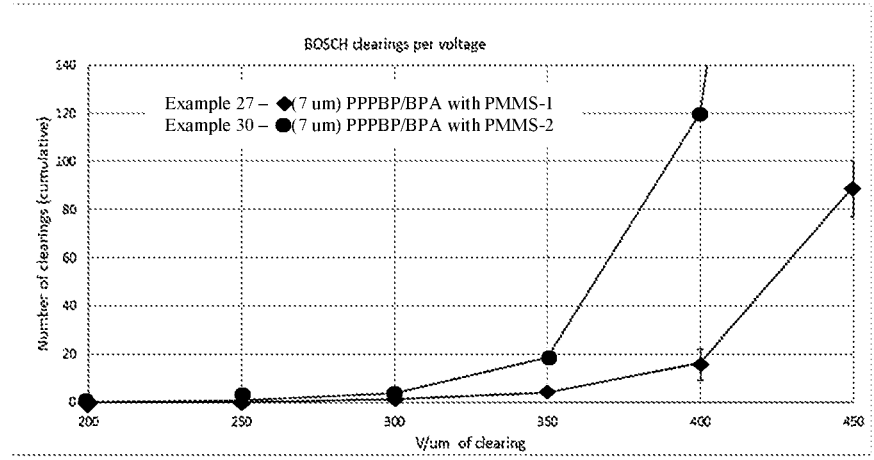
FIG. 7 is a graph showing the cumulative number of clearing counts as a function of the voltage per μm.

FIG. 7 is a graph showing the cumulative number of clearing counts as a function of the voltage per μm of Ex27 (containing PMSS-1) and Ex30 (containing PMSS-2).

Figure 8:
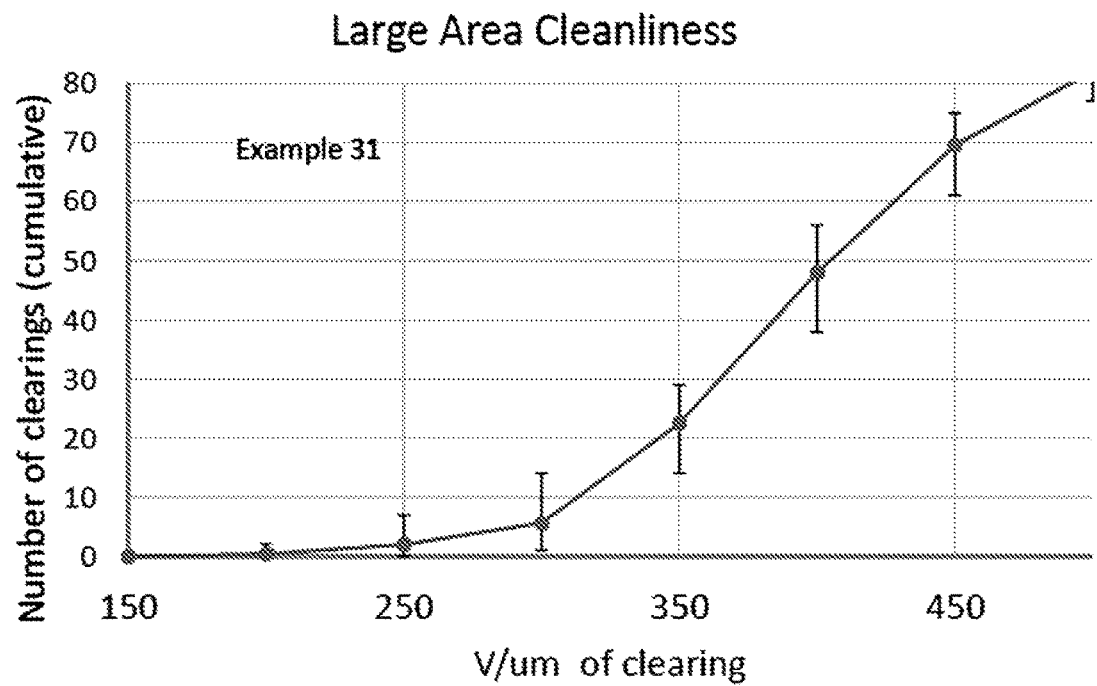
FIG. 8 is a graph showing the cumulative number of clearings versus the voltage per μm of clearing for a large area electrode.

The cumulative number of clearings versus the voltage per μm of clearing for a large area electrode made from the film of Ex31, containing PC-Si(o), PMSS-1, and PETS, is shown in FIG. 8.

Overall, the examples show that a combination of roughening agent and slip agent allows effective film production and handling, without at the same time resulting in the higher electrical clearing counts associated with higher loadings of roughening agents or slip agents.

This disclosure is further illustrated by the following aspects.

Aspect 1: A composition, comprising: 65.0-99.85 wt % of a high heat copolycarbonate having a number ratio of carbon atoms to a total of hydrogen, oxygen, and fluorine atoms of less than 1.12, preferably from 0.83 to less than 1.12; 0.05-0.5 wt % of a first roughening agent comprising a particulate, crosslinked silicone; 0.1-15.0 wt % of an organic slip agent wherein the organic slip agent comprises pentaerythritol tetrastearate, dipentaerythritol hexastearate, glycerol tristearate, high density poly(ethylene), polymethylpentene, a poly(carbonate-siloxane), or a combination thereof, optionally, 2.0-10.0 wt % of a second roughening agent; optionally, 1.0-50.0 wt % of a bisphenol A homopolymer; and optionally, 0.02-0.06 wt % of an antioxidant; wherein each amount is based on the total weight of the composition and totals 100 wt %. The high heat copolycarbonate can include low heat bisphenol groups derived from a low heat monomer where the corresponding homopolycarbonate of the monomer has a Tg of lower than 155° C., determined according to ASTM E1640-13 with a 1° C./min heating rate and high heat bisphenol groups derived from a high heat bisphenol monomer having at least where the corresponding homopolycarbonate of the monomer has a Tg of 155° C. or higher, determined according to ASTM E1640-13 with a 1° C./min heating rate.

Aspect 2: The composition of aspect 1, wherein the high heat copolycarbonate is an N-phenylphenolphthaleinylbisphenol-bisphenol A copolycarbonate, a 3,3,5-trimethylcyclohexanone bisphenol-bisphenol A copolycarbonate, or a combination thereof.

Aspect 3: The composition of aspect 1 or aspect 2, wherein the high heat copolycarbonate composition is a film having a breakdown strength of greater than 700 V per μm as determined in accordance with ASTM D149 using a ball electrode.

Aspect 4: The composition of any one or more of aspects 1-3, wherein the first roughening agent comprises a particulate polymethylsilsesquioxane having an average particle diameter of 0.5-2.5 μm as determined by scanning electron microscopy of a sample of the particles.

Aspect 5: The composition of any one or more of aspects 1-4, wherein the second roughening agent is present, and comprises a cyclic olefin copolymer.

Aspect 6: The composition of any one or more of aspects 1-5, wherein the organic slip agent comprises 5.0-15.0 wt % of a poly(carbonate-siloxane).

Aspect 7: The composition of any one or more of aspects 1-6, wherein the organic slip agent comprises 0.1-1 wt % of the pentaerythritol tetrastearate, and 3.0-10 wt. % of the poly(carbonate-siloxane).

Aspect 8: The composition of any one or more of aspects 1-7, wherein the bisphenol A homopolymer is present, preferably in an amount of 1.0-35.0 wt %.

Aspect 9: The composition of any one or more of aspects 1-8, comprising 65.0-99.85 wt % of a high heat copolycarbonate comprising an N-phenylphenolphthaleinylbisphenol-bisphenol A copolycarbonate, a 3,3,5-trimethylcyclohexanone bisphenol-bisphenol A copolycarbonate, or a combination thereof; 0.1-1 wt % of the pentaerythritol tetrastearate, 3.0-10 wt. % of the poly(carbonate-siloxane), and 0.05-0.5 wt % of a particulate polymethylsilsesquioxane roughening agent having a mean particle diameter of 0.5-2.5 µm as determined by scanning electron microscopy; wherein each amount is based on the total weight of the composition and totals 100 wt %.

Aspect 10. The composition of any one of the preceding aspects, further comprising a second roughening agent in an amount of 2.0-10.0 wt %, based on the total weight of the composition, wherein the second roughening agent comprises a cyclic olefin copolymer.

Aspect 11. The composition of any one of the preceding aspects, further comprising a bisphenol A homopolymer in an amount of 1.0-50.0 wt %, based on the total weight of the composition, preferably in an amount of 1.0-35.0 wt %.

Aspect 12. The composition of any one of the preceding aspects, further comprising an antioxidant in an amount of 0.02-0.06 wt %, based on the total weight of the composition.

Aspect 13: An extruded film comprising the composition of any one or more of aspects 1-12.

Aspect 14: The extruded film of aspect 13, having a thickness of 1-10 µm, or 1-7 µm, or 3-7 µm, or 3-5 m.

Aspect 15: The extruded film of one of aspects 9-12, wherein the film has at least one of the following properties, preferably all of the following properties: a Tg of 170-250° C. as determined in accordance with ASTM E1640-13; a Bosch Test clearing count of 0-10 at 300 V/µm; a dielectric constant of greater than 2.5; and a dissipation factor of less than 1.0%.

Aspect 16: A capacitor, comprising the film of any one or more of aspects 13-15; and an electrically conductive metal layer in contact with the film, preferably wherein the conductive layer has a resistivity of 2.0-125.0Ω per square meter.

Aspect 17: An electronic device comprising the extruded film of one of aspects 13-15 or the capacitor of aspect 16.

The singular forms "a," "an," and "the" include plural referents unless the context clearly dictates otherwise. "Or" means "and/or" unless clearly indicated otherwise by context. A "combination thereof" is open and includes any combination comprising at least one of the listed components or properties optionally together with a like or equivalent component or property not listed. The terms "first," "second," and the like, "primary," "secondary," and the like, as used herein do not denote any order, quantity, or importance, but rather are used to distinguish one element from another. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. A "combination" is inclusive of blends, mixtures, alloys, reaction products, and the like.

Unless defined otherwise, technical and scientific terms used herein have the same meaning as is commonly understood by one of skill in the art to which this disclosure belongs. Compounds are described using standard nomenclature. Any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1-3 heteroatoms, for example, oxygen, nitrogen, halogen, silicon, sulfur, or a combination thereof; "alkyl" means a straight or branched chain, saturated monovalent hydrocarbon group; "alkylene" means a straight or branched chain, saturated, divalent hydrocarbon group; "alkylidene" means a straight or branched chain, saturated divalent hydrocarbon group, with both valences on a single common carbon atom; "alkenyl" means a straight or branched chain monovalent hydrocarbon group having at least two carbons joined by a carbon-carbon double bond; "cycloalkyl" means a non-aromatic monovalent monocyclic or multicyclic hydrocarbon group having at least three carbon atoms; "alkenyl" means a divalent hydrocarbon group having at least two carbon atoms, with at least one degree of unsaturation; "aryl" means an aromatic monovalent group containing only carbon in the aromatic ring or rings; "arylene" means an aromatic divalent group containing only carbon in the aromatic ring or rings; "alkylarylene" means an arylene group that has been substituted with an alkyl group as defined above, with 4-methylphenylene being an exemplary alkylarylene group; "arylalkylene" means an alkylene group that has been substituted with an aryl group as defined above, with benzyl being an exemplary arylalkylene group; "acyl" means an alkyl group as defined above with the indicated number of carbon atoms attached through a carbonyl carbon bridge (—C(=O)—); "alkoxy" means an alkyl group as defined above with the indicated number of carbon atoms attached through an oxygen bridge (—O—); "aryloxy" means an aryl group as defined above with the indicated number of carbon atoms, attached through an oxygen bridge (—O—); "alkylarylenoxy" means an alkylarylene group attached through an oxygen bridge (—O—); arylalkyleneoxy means arylalkylene attached through an oxygen bridge; "alkenyloxy" means an alkenyl group attached through an oxygen bridge; and "cycloalkoxy" means a non-aromatic monovalent monocyclic or multicyclic hydrocarbon group having at least three carbon atoms, attached though an oxygen bridge. "Fused" as used herein means that the indicated group is fused to a $C_{3-8}$ cycloaliphatic, $C_{6-13}$ aromatic, or $C_{2-12}$ heteroaromatic group.

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents are permissible provided that the substitutions do not significantly adversely affect synthesis or use of the compound.

Exemplary groups that can be present on a "substituted" position include, but are not limited to, cyano; nitro; alkanoyl such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2-8, or 2-6 carbon atoms); $C_{1-6}$ or $C_{1-3}$ alkoxy; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi ($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ arylalkyl having 1-3 separate or fused rings and 6-18 ring carbon atoms; or arylalkyleneoxy having 1-3 separate or fused rings and 6-18 ring carbon atoms, with benzyloxy being an exemplary arylalkyleneoxy. The number of carbon atoms indicated for a given group includes any substituents.

All cited patents, patent applications, and other references are incorporated herein by reference in their entirety, but if a term in this application contradicts or conflicts with a term in the incorporated reference, the term from the present application takes precedence.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An extruded film comprising a composition, comprising:
   65.0-99.85 wt % of a high heat copolycarbonate comprising
      low heat bisphenol groups derived from a low heat monomer where the corresponding homopolycarbonate of the monomer has a Tg of lower than 155° C., determined according to ASTM E1640-13 with a 1° C./min heating rate, and
      high heat bisphenol groups derived from a high heat bisphenol monomer where the corresponding homopolycarbonate of the monomer has a Tg of 155° C. or higher, determined according to ASTM E1640-13 with a 1° C./min heating rate,
   the high heat copolycarbonate further having a number ratio of carbon atoms to a total of hydrogen, oxygen, and fluorine atoms of less than 1.12;
   0.1-15.0 wt % of an organic slip agent, wherein the organic slip agent comprises pentaerythritol tetrastearate, dipentaerythritol hexastearate, glycerol tristearate, high density poly(ethylene), polymethylpentene, a poly(carbonate-siloxane), or a combination thereof;
   0.05-0.5 wt % of a roughening agent comprising a particulate, crosslinked silicone; and
   optionally, 1.0-50.0 wt % of a bisphenol A homopolymer comprising a weight average molecular weight of 19,000-21,000 Daltons, as measured by gel permeation chromatography (GPC), using a crosslinked styrene-divinylbenzene column and calibrated to bisphenol A homopolycarbonate references,
   wherein each amount is based on the total weight of the composition and totals 100 wt %, and
   wherein the extruded film has
      a glass transition temperature of 170-250° C. determined in accordance with ASTM E1640-13; and
      a Bosch Test clearing count of 0-10 at 300 V/μm.

2. The extruded film of claim 1, wherein the roughening agent of the composition comprises a polymethylsilsesquioxane having a mean particle diameter of 0.5-2.5 μm as determined by scanning electron microscopy.

3. The extruded film of claim 1, wherein the high heat copolycarbonate of the composition has a glass transition temperature of 170-250° C. determined according to ASTM E1640-13 with a 1° C./min heating rate.

4. The extruded film of claim 1, wherein the high heat copolycarbonate is an N-phenylphenolphthaleinylbisphenol-bisphenol A copolycarbonate, or a combination of an N-phenylphenolphthaleinylbisphenol-bisphenol A copolycarbonate and a 3,3,5-trimethylcyclohexanone bisphenol-bisphenol A copolycarbonate.

5. The extruded film of claim 1, wherein the organic slip agent of the composition comprises
   0.1-1 wt % of the pentaerythritol tetrastearate, and
   3.0-10 wt. % of the poly(carbonate-siloxane).

6. The extruded film of claim 1 wherein the composition comprises
   65.0-99.85 wt % of a high heat copolycarbonate comprising an N-phenylphenolphthaleinylbisphenol-bisphenol A copolycarbonate, a 3,3,5-trimethylcyclohexanone bisphenol-bisphenol A copolycarbonate, or a combination thereof;
   0.1-1 wt % of the pentaerythritol tetrastearate,
   3.0-10 wt. % of the poly(carbonate-siloxane), and
   0.05-0.5 wt % of a particulate polymethylsilsesquioxane roughening agent having a mean particle diameter of 0.5-2.5 um as determined by scanning electron microscopy;
wherein each amount is based on the total weight of the composition and totals 100 wt %.

7. The extruded film of claim 1, wherein the composition further comprises a bisphenol A homopolymer in an amount of 1.0-50.0 wt %, based on the total weight of the composition.

8. The extruded film of claim 1, wherein the composition further comprises an antioxidant in an amount of 0.02-0.06 wt %, based on the total weight of the composition.

9. The extruded film of claim 1, having a thickness of 1-10 μm.

10. The extruded film of claim 1, having a breakdown strength of greater than 700 V per μm as determined in accordance with ASTM D149 using a ball electrode.

11. The extruded film of claim 1, wherein the film has at least one of the following properties:
   a dielectric constant of greater than 2.5; and
   a dissipation factor of less than 1.0%.

12. A capacitor, comprising
   the extruded film of claim 1; and
   an electrically conductive metal layer in contact with the film.

13. An electronic device comprising the capacitor of claim 12.

14. The extruded film of claim 1, wherein the high heat copolycarbonate of the composition comprises an N-phenylphenolphthaleinylbisphenol-bisphenol A copolycarbonate.

15. The extruded film of claim 1, wherein the organic slip agent of the composition comprises 0.1-1 wt % -pentaerythritol tetrastearate.

16. The extruded film of claim 1, wherein the high heat copolycarbonate of the composition comprises an N-phenylphenolphthaleinylbisphenol-bisphenol A copolycarbonate and wherein the organic slip agent comprises 0.1-1 wt % pentaerythritol tetrastearate.

17. The extruded film of claim 1, wherein the high heat copolycarbonate of the composition comprises a 3,3,5-trimethylcyclohexanone bisphenol-bisphenol A copolycarbonate and wherein the organic slip agent comprises pentaerythritol tetrastearate.

18. A composition, comprising:
65.0-99.85 wt % of a high heat copolycarbonate comprising
  low heat bisphenol groups derived from a low heat monomer where the corresponding homopolycarbonate of the monomer has a Tg of lower than 155° C., determined according to ASTM E1640-13 with a 1° C./min heating rate, and
  high heat bisphenol groups derived from a high heat bisphenol monomer where the corresponding homopolycarbonate of the monomer has a Tg of 155° C. or higher, determined according to ASTM E1640-13 with a 1° C./min heating rate,
the high heat copolycarbonate further having a number ratio of carbon atoms to a total of hydrogen, oxygen, and fluorine atoms of less than 1.12;
  0.1-15.0 wt % of an organic slip agent, wherein the organic slip agent comprises pentaerythritol tetrastearate, dipentaerythritol hexastearate, glycerol tristearate, high density poly(ethylene), polymethylpentene, a poly(carbonate-siloxane), or a combination thereof; and
  0.05-0.5 wt % of a first roughening agent comprising a particulate, crosslinked silicone;
wherein each amount is based on the total weight of the composition and totals 100 wt %; and
a second roughening agent in an amount of 2.0-10.0 wt %, based on the total weight of the composition, wherein the second roughening agent comprises a cyclic olefin copolymer.

19. An extruded film comprising the composition of claim 18.

20. A capacitor, comprising
the extruded film of claim 19; and
an electrically conductive metal layer in contact with the film.

21. An electronic device comprising the capacitor of claim 20.

22. A composition, comprising:
65.0-99.85 wt % of a high heat copolycarbonate comprising
  low heat bisphenol groups derived from a low heat monomer where the corresponding homopolycarbonate of the monomer has a Tg of lower than 155° C. determined according to ASTM E1640-13 with a 1° C./min heating rate, and
  high heat bisphenol groups derived from a high heat bisphenol monomer where the corresponding homopolycarbonate of the monomer has a Tg of 155° C. or higher, determined according to ASTM E1640-13 with a 1° C./min heating rate,
the high heat copolycarbonate further having a number ratio of carbon atoms to a total of hydrogen, oxygen, and fluorine atoms of less than 1.12;
wherein the high heat copolycarbonate comprises a 3,3,5-trimethylcyclohexanone bisphenol-bisphenol A copolycarbonate;
  0.1-15.0 wt % of an organic slip agent, wherein the organic slip agent comprises pentaerythritol tetrastearate, dipentaerythritol hexastearate, glycerol tristearate, high density poly(ethylene), polymethylpentene, a poly(carbonate-siloxane), or a combination thereof; and
  0.05-0.5 wt % of a roughening agent comprising a particulate, crosslinked silicone;
wherein each amount is based on the total weight of the composition and totals 100 wt %.

23. An extruded film comprising the composition of claim 22.

24. A capacitor, comprising
the extruded film of claim 23; and
an electrically conductive metal layer in contact with the film.

25. An electronic device comprising the capacitor of claim 24.

* * * * *